(12) United States Patent
Ishikawa

(10) Patent No.: US 9,112,750 B2
(45) Date of Patent: Aug. 18, 2015

(54) JOB MANAGEMENT SERVER AND JOB MANAGEMENT METHOD

(75) Inventor: Yohey Ishikawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 27 days.

(21) Appl. No.: 14/007,507

(22) PCT Filed: May 31, 2011

(86) PCT No.: PCT/JP2011/062506
§ 371 (c)(1),
(2), (4) Date: Sep. 25, 2013

(87) PCT Pub. No.: WO2012/164689
PCT Pub. Date: Dec. 6, 2012

(65) Prior Publication Data
US 2014/0019613 A1  Jan. 16, 2014

(51) Int. Cl.
*H04L 29/08* (2006.01)
*G06F 11/20* (2006.01)
*G06F 11/14* (2006.01)
*G06F 11/34* (2006.01)
*G06F 9/50* (2006.01)

(52) U.S. Cl.
CPC .......... *H04L 29/08153* (2013.01); *G06F 9/505* (2013.01); *G06F 9/5077* (2013.01); *G06F 11/1484* (2013.01); *G06F 11/20* (2013.01); *G06F 11/2028* (2013.01); *G06F 11/3419* (2013.01); *G06F 11/3442* (2013.01); *G06F 11/203* (2013.01); *G06F 2201/805* (2013.01); *G06F 2209/501* (2013.01); *G06F 2209/508* (2013.01)

(58) Field of Classification Search
CPC ................................................ H04L 29/08153

USPC .......................................... 709/223, 224, 225
See application file for complete search history.

(56) References Cited

U.S. PATENT DOCUMENTS

2005/0010608 A1   1/2005   Horikawa
2007/0180314 A1   8/2007   Kawashima et al.
(Continued)

FOREIGN PATENT DOCUMENTS

| JP | 07-084967 A | 3/1995 |
|---|---|---|
| JP | 2004-295731 A | 10/2004 |
| JP | 2005-031771 A | 2/2005 |
| JP | 2007-207219 A | 8/2007 |

(Continued)

OTHER PUBLICATIONS

"DataFlux Data Management Server User's Guide"—DataFlux, SAS, Jun. 2012 http://support.sas.com/documentation/onlinedoc/dfdmserver/2.3/DMServer_Users_23.pdf.*

*Primary Examiner* — Randy Scott
(74) *Attorney, Agent, or Firm* — Volpe and Koenig, P.C.

(57) ABSTRACT

A job management server for managing a plurality of jobs to be executed by a virtual computer generated on a computer, a job management part to manage information on a job net which configures a plurality of jobs and allocate a plurality of jobs included in a job net to the virtual computer, and a recovery part to monitor an execution status of each of the plurality of jobs included in the job net and perform recovery processing, wherein the job management server is configured to: specify a target job for changing allocation, in a case where a failure has occurred in a first virtual computer to execute a first job included in the first job net; determine a performance of a virtual computer required to execute the target job.

10 Claims, 21 Drawing Sheets

(56) References Cited

U.S. PATENT DOCUMENTS

| | | |
|---|---|---|
| 2008/0005745 A1 | 1/2008 | Kureya et al. |
| 2008/0294937 A1 | 11/2008 | Ueda |
| 2009/0044265 A1* | 2/2009 | Ghosh et al. .................. 726/14 |
| 2013/0204995 A1* | 8/2013 | Fu et al. ........................ 709/223 |

FOREIGN PATENT DOCUMENTS

| | | |
|---|---|---|
| JP | 2008-009622 A | 1/2008 |
| JP | 2008-293358 A | 12/2008 |
| JP | 2010-086317 A | 4/2010 |
| JP | 2011-053995 A | 3/2011 |

* cited by examiner

FIG. 5

PHYSICAL CONFIGURATION MANAGEMENT TABLE 141

| SERVER NAME 701 | VIRTUALIZATION CONTROLLER NAME 702 | PROCESSOR 703 | MEMORY 704 | STORAGE CAPACITY 705 |
|---|---|---|---|---|
| SERVER 1 | VIRTUALIZATION CONTROLLER 1 | 2GHz × 8 | 8GB | 500GB |
| SERVER 2 | VIRTUALIZATION CONTROLLER 2 | 2.5GHz × 6 | 16GB | 500GB |
| SERVER 3 | VIRTUALIZATION CONTROLLER 3 | 3GHz × 8 | 8GB | 1TB |
| ... | ... | ... | ... | 500GB |

VIRTUAL CONFIGURATION MANAGEMENT TABLE 142

| VIRTUAL SERVER NAME 801 | SERVER NAME 802 | OS 803 | PROCESSOR 804 | MEMORY 805 | STORAGE CAPACITY 806 | STATUS 807 |
|---|---|---|---|---|---|---|
| VIRTUAL SERVER 1 | SERVER1 | OS 1 | 2GHz × 2 | 2GB | 20GB | IN USE |
| VIRTUAL SERVER 2 | SERVER1 | OS 2 | 2GHz × 2 | 2GB | 20GB | BEING GENERATED |
| VIRTUAL SERVER 3 | SERVER2 | OS 1 | 2.5GHz × 1 | 2GB | 20GB | RESERVED |
| ... | ... | ... | ... | ... | ... | ... |

FIG. 6

DEPLOYMENT EXECUTION TIME MANAGEMENT TABLE

| SERVER NAME | OS | DEPLOYMENT TIME |
|---|---|---|
| SERVER 1 | OS 1 | 180s |
| SERVER 2 | OS 2 | 120s |
| SERVER 3 | OS 1 | 240s |
| ⋮ | ⋮ | ⋮ |

FIG. 7

FREE RESOURCE MANAGEMENT TABLE

| SERVER NAME | PROCESSOR | MEMORY | STORAGE CAPACITY |
|---|---|---|---|
| SERVER 1 | 2GHz × 6 | 6GB | 500GB |
|  |  |  | 500GB |
| SERVER 2 | 2.5GHz × 5 | 15GB | 800GB |
| SERVER 3 | 3GHz × 7 | 7GB | 0GB |
| ⋮ | ⋮ | ⋮ | ⋮ |

FIG. 8

JOB NET CONFIGURATION MANAGEMENT TABLE

| JOB NET NAME | JOB NAME | RELATED JOB NAME | OB START CONDITION | EXECUTION LIMIT TIME |
|---|---|---|---|---|
| JOB NET 1 | JOB 1 | JOB 2 | NONE | WITHIN 4000 SECONDS |
| | JOB 2 | JOB 3 | CONDITION 1 | |
| | | JOB 6 | CONDITION 2 | |
| | JOB 3 | JOB 4 | NONE | |
| | JOB 4 | JOB 5 | NONE | |
| | JOB 5 | EXIT | NONE | |
| | JOB 6 | JOB 7 | CONDITION 3 | |
| | | JOB 8 | CONDITION 4 | |
| | JOB 7 | JOB 5 | NONE | |
| | JOB 8 | EXIT | NONE | |
| JOB NET 2 | ⋮ | ⋮ | ⋮ | ⋮ |
| JOB NET 3 | ⋮ | ⋮ | ⋮ | ⋮ |
| ⋮ | ⋮ | ⋮ | ⋮ | ⋮ |

JOB NET EXECUTION MANAGEMENT TABLE

| JOB NET NAME 1201 | JOB NAME 1202 | VIRTUAL SERVER NAME 1203 | STATUS 1204 | ELAPSED TIME 1205 | RETURN VALUE 1206 152 |
|---|---|---|---|---|---|
| JOBNET 1 | JOB 1 | VIRTUAL SERVER 1 | SUCCESSFUL COMPLETION | 300s | 0 |
| | JOB 2 | VIRTUAL SERVER 2 | ACTIVE | NULL | NULL |
| | JOB 3 | VIRTUAL SERVER 3 | READY TO BE EXECUTED | NULL | NULL |
| ... | ... | ... | ... | ... | ... |

FIG. 10

JOB EXECUTION TIME MANAGEMENT TABLE

| JOB NAME | MACHINE SPECIFICATIONS | | | EXECUTION TIME |
| --- | --- | --- | --- | --- |
| | OS | PROCESSOR | MEMORY | |
| JOB1 | OS1 | 2GHz × 1 | 2GB | 300s |
| JOB2 | OS1 | 2GHz × 1 | 2GB | 600s |
| JOB3 | OS1 | 2.5GHz × 1 | 2GB | 600s |
| JOB3 | OS1 | 2GHz × 1 | 2GB | 900s |
| JOB4 | OS1 | 2GHz × 1 | 2GB | 1200s |
| JOB4 | OS2 | 2.5GHz × 1 | 2GB | 1000s |
| JOB4 | OS1 | 2.5GHz × 2 | 2GB | 900s |
| JOB5 | OS2 | 2GHz × 2 | 2GB | 1200s |
| JOB5 | OS2 | 3GHz × 2 | 4GB | 1900s |
| JOB6 | OS1 | 2.5GHz × 1 | 4GB | 1200s |
| JOB6 | OS1 | 3GHz × 2 | 4GB | 900s |
| ⋮ | ⋮ | ⋮ | ⋮ | ⋮ |

FIG. 11

ALLOCATION MANAGEMENT TABLE

| 1401<br>PATH NAME | 1402<br>JOB NAME | 1403<br>STATUS | 1404<br>ELAPSED TIME | 1405<br>EXPECTED COMPLETION TIME (BEFORE CHANGE) | 1406<br>EXPECTED COMPLETION TIME (AFTER CHANGE) | 1407<br>MACHINE SPECIFICATIONS |
|---|---|---|---|---|---|---|
| PATH 1 | JOB1 | SUCCESSFUL COMPLETION | 300s | 300s | 300s | — |
| | JOB2 | FAILURE | 300s | 300s+600s +120s | 900s | 2GHz × 1<br>2GB<br>OS1 |
| | JOB3 | READY TO BE EXECUTED | — | 600s | 600s | CANNOT BE SHORTENED |
| | JOB4 | READY TO BE EXECUTED | — | 1200s | 900s | 2GHz × 1<br>2GB<br>OS1 |
| | JOB5 | READY TO BE EXECUTED | — | 1200s | 900s | 2GHz × 1<br>2GB<br>OS2 |
| | TOTAL | — | 600s | 4200s | 3600s | — |
| PATH 2 | JOB1 | SUCCESSFUL COMPLETION | 300s | 300s | 300s | — |
| | JOB2 | FAILURE | 300s | 300s+600s | 900s | 2GHz × 1<br>2GB<br>OS1 |
| | JOB6 | READY TO BE EXECUTED | — | 1200s | 900s | 3GHz × 1<br>4GB<br>OS1 |
| | JOB7 | READY TO BE EXECUTED | — | 900s | 900s | CANNOT BE SHORTENED |
| | JOB5 | READY TO BE EXECUTED | — | 1200s | 900s | 2GHz × 1<br>2GB |
| | TOTAL | READY TO BE EXECUTED | 600s | 4500s | 3900s | — |
| ⋮ | ⋮ | ⋮ | ⋮ | ⋮ | ⋮ | ⋮ |

JOB MANAGEMENT SERVER AND JOB MANAGEMENT METHOD

BACKGROUND OF THE INVENTION

This invention relates to a method of managing a schedule of a job and more specifically, to a method of managing a schedule of a job in response to occurrence of a failure. A virtualization technology that makes multiple virtual computers run on a physical computer has been employed widely. Multiple jobs are executed on the virtual computers to accomplish a certain task. Various ways have been devised to recover a job in response to a failure in a virtual computer.

According to a known method, in response to occurrence of a failure in a virtual computer, an active job is moved to a different virtual computer, for example.

Japanese Patent Application Publication No. 2005-31771 describes that a computer to which an unprocessed job is to be allocated is searched and this job is moved to this computer, in a case where a failure or performance degradation has occurred in a virtual computer. Japanese Patent Application Publication No. 2008-9622 describes that a first server and a second server configured in the same server environment as the first server are made to execute jobs in a job net.

SUMMARY OF THE INVENTION

In the present invention described in Japanese Patent Application Publication No. 2005-31771, a computer to which a job is to be moved should be prepared in advance. Further, in the present invention described in Japanese Patent Application Publication No. 2008-9622, the first and second servers should be prepared for one job net and this occupies a resource to be used by a different job net.

The conventional techniques do not make allowance for time of completion of a job net. Hence, a job might not be completed within predetermined time and this might affect an entire task.

The present invention can be appreciated by the description which follows in conjunction with the following figures, wherein: a job management server for managing a plurality of jobs to be executed by at least one virtual computer generated on at least one computer, wherein the job management server comprises a first processor, a first memory connected to the first processor, a first interface connected to the first processor, the first interface establishing connection to an external device, a job management part to manage information on at least one job net which configures a plurality of jobs and allocate a plurality of jobs included in a job net to at least one virtual computer, and a recovery part to monitor an execution status of each of the plurality of jobs included in the job net and perform recovery processing in a case of detecting a failure in the virtual computer to execute a job. Wherein the job management server is configured to: allocate a plurality of jobs included in a first job net to the at least one virtual computer, in a case of receiving an instruction to execute the first job net; specify at least one target job for changing allocation from the plurality of jobs included in the first job net, in a case where a failure has occurred in a first virtual computer to execute a first job included in the first job net; determine a performance of a virtual computer required to execute the at least one target job; and generate change information to be used to allocate the at least one target job to a new virtual computer having the determined performance.

According to one aspect of the present invention, a management server can automatically determine the performance of a virtual computer required to execute a job forming a job net. This eliminates the need of preparing beforehand a standby virtual server to which a job is to be moved, and realizes effective use of a physical resource. According to one aspect of the present invention, the performance of a virtual computer is determined such that process on a job net is completed within execution limit time. This allows handling of a failure while exerting no influence on an entire task.

BRIEF DESCRIPTION OF THE DRAWINGS

The present invention can be appreciated by the description which follows in conjunction with the following figures, wherein:

FIG. 5 is an explanatory diagram illustrating an example of a physical configuration management table according to the embodiment of this invention;

FIG. 6 is an explanatory diagram illustrating an example of a virtual configuration management table according to the embodiment of this invention;

FIG. 7 is an explanatory diagram illustrating an example of a deployment execution time management table according to the embodiment of this invention;

FIG. 8 is an explanatory diagram illustrating an example of a free resource management table according to the embodiment of this invention;

FIG. 9 is an explanatory diagram illustrating an example of a job net configuration management table according to the embodiment of this invention;

FIG. 10 is an explanatory diagram illustrating an example of a job net execution management table according to the embodiment of this invention;

FIG. 11 is an explanatory diagram illustrating an example of a job execution time management table according to the embodiment of this invention;

FIG. 12 is an explanatory diagram illustrating an example of an allocation management table according to the embodiment of this invention;

DETAILED DESCRIPTION OF THE PREFERRED EMBODIMENT

Figure 1:
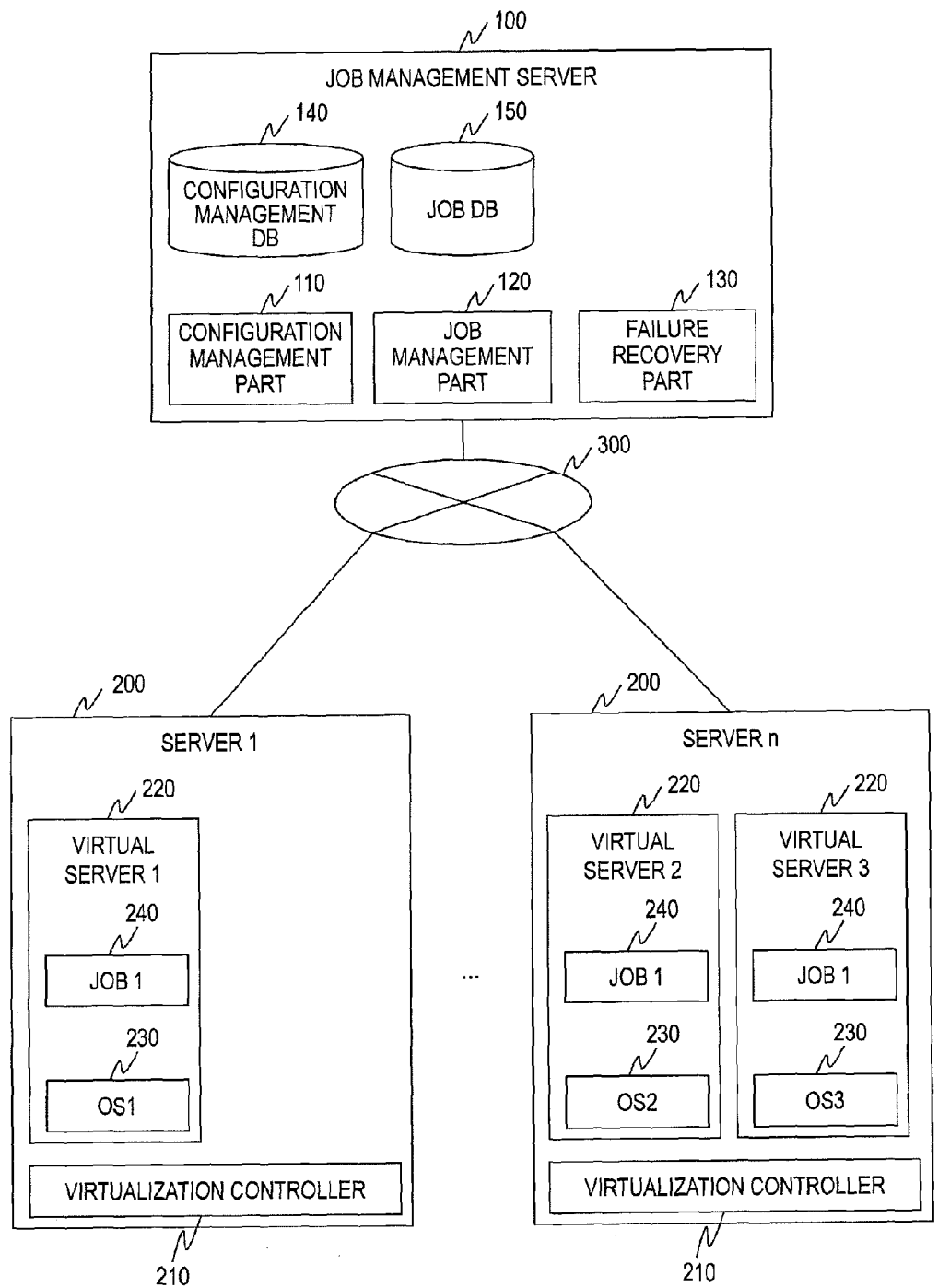
FIG. 1 is a block diagram illustrating a configuration of a computer system according to an embodiment of this invention.

FIG. 1 is a block diagram illustrating the configuration of a computer system according to an embodiment of this invention.

The computer system comprises a job management server 100 and a plurality of servers 200. The job management server 100 and each server 200 are connected via a management network 300.

The management network 300 may be a WAN or a LAN, for example. Meanwhile, connection may be established in any way as long as it allows mutual communication. The job management server 100 and the servers 200 may be connected directly.

The job management server 100 manages the configuration of the computer system and a schedule of a job to be executed on each server 200. The job management server 100 includes a configuration management part 110, a job management part 120, a failure recovery part 130, a configuration management DB 140, and a job DB 150.

The configuration management part 110 manages the configuration of the computer system. The configuration of the computer system mentioned herein includes the physical configuration of the plurality of servers 200, the physical configuration of a virtual server 220, the connection structure of a network, and the like.

The job management part 120 manages a job to be executed on the virtual server 220 to run on each server 200. The job management part 120 has a function as a scheduler for a job. The job management part 120 manages the arrangement and an execution order of jobs by using this function.

The failure recovery part 130 executes failure recovery processing in a case where a failure has occurred in the virtual server 220 to execute a job.

The configuration management DB 140 stores information indicating the configuration of the computer system. The job DB 150 stores information used to manage a job.

Figure 2:
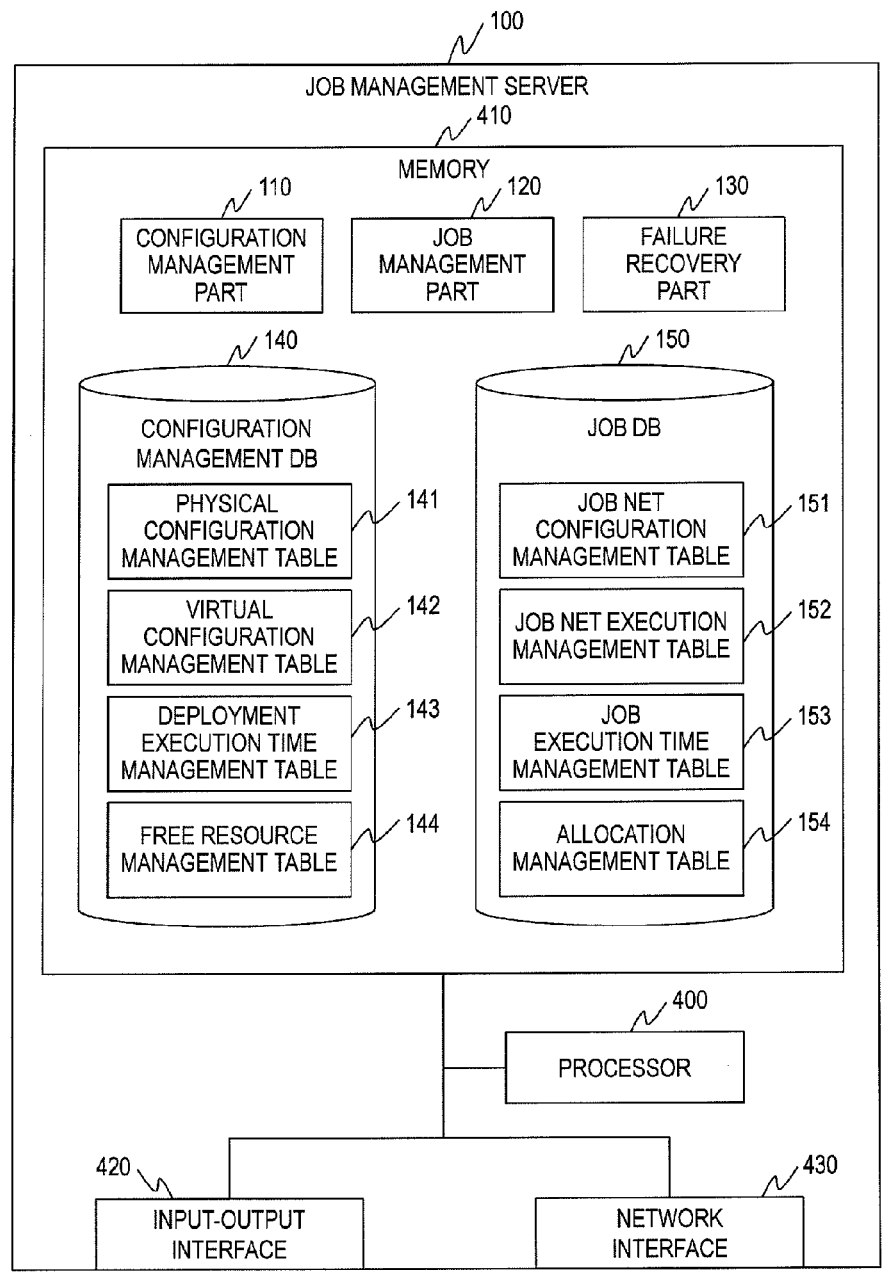
FIG. 2 is a block diagram illustrating an exemplary hardware configuration and an exemplary software configuration of a job management server according to the embodiment of this invention.

The configuration of the job management server 100 is described by referring to FIG. 2.

The server 200 generates a plurality of virtual servers 220 and make the plurality of virtual servers 220 run. The server 200 includes a virtualization controller 210.

The virtualization controller 210 generates and manages the virtual server 220. More specifically, the virtualization controller 210 generates the virtual server 220 by allocating a physical resource in the server 200 to the virtual server 220.

A physical resource may be allocated to the virtual server 220 in any way. Examples of an applicable way include a way of allocating a logically partitioned physical resource (LPAR) and a way of allocating a physical resource in a time-sharing manner.

The virtual server 220 is a virtual computer to execute a job. The virtual server 220 includes an OS 230 to execute one or more jobs 240.

Figure 3:
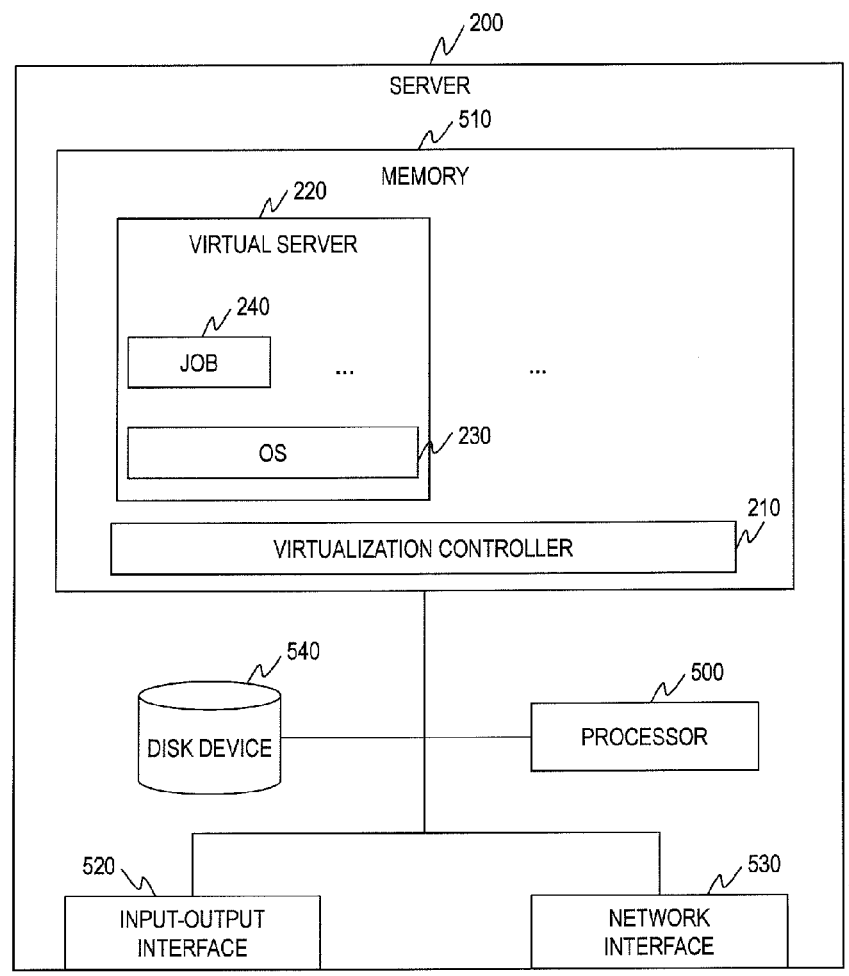
FIG. 3 is a block diagram illustrating an exemplary hardware configuration and an exemplary software configuration of a server according to the embodiment of this invention.

The configuration of the server 200 is described by referring to FIG. 3.

FIG. 2 is a block diagram illustrating an exemplary hardware configuration and an exemplary software configuration of the job management server 100 according to the embodiment of this invention.

The job management server 100 includes a processor 400, a memory 410, an input-output interface 420, and a network interface 430.

The processor 400 executes a program in the memory 410. Execution of the program by the processor 400 can realize the function of the job management server 100.

The memory 410 stores the program to be executed by the processor 400 and information required to execute this program. The memory 410 stores the configuration management part 110, the job management part 120, the failure recovery part 130, the configuration management DB 140, and the job DB 150.

Hereafter, processes described as being performed by the configuration management part 110, the job management part 120, and the failure recovery part 130 mean that a program to realize a corresponding configuration part is being executed by the processor 400.

The configuration management DB 140 stores a physical configuration management table 141, a virtual configuration management table 142, a deployment execution time management table 143, and a free resource management table 144.

The physical configuration management table 141 stores information on the structure of a physical resource in the server 200 and on the software configuration of the server 200. The physical configuration management table 141 will be described in detail later by referring to FIG. 5.

The virtual configuration management table 142 stores information on the configuration of the virtual server 220. The virtual configuration management table 142 will be described in detail later by referring to FIG. 6.

The deployment execution time management table 143 stores information on execution time of deployment processing on a job. The deployment processing on a job mentioned herein means processing of generating the virtual server 220, allocating a job to the generated virtual server 220, and making configuration for start of a job. The deployment execution time management table 143 will be described in detail later by referring to FIG. 7.

The free resource management table 144 stores information on the volume of a resource of an unused physical resource in each server 200. The free resource management table 144 will be described in detail later by referring to FIG. 8.

The free resource management table 144 can be generated by using the physical configuration management table 141 and the virtual configuration management table 142, so that it is not required to be stored in advance in the configuration management DB 140. If not stored in advance, in order to perform predetermined process, the free resource management table 144 is generated by the job management server 100 and then stored in the memory 410.

The job DB 150 stores a job net configuration management table 151, a job net execution management table 152, a job execution time management table 153, and an allocation management table 154.

The job net configuration management table 151 stores information on the configuration of a job net. The job net mentioned herein means a group of jobs representing the order in which the jobs are executed. The job net configuration management table 151 will be described in detail later by referring to FIG. 9.

The job net execution management table 152 stores information on an execution status of each job in the job net. The job net execution management table 152 will be described in detail later by referring to FIG. 10.

The job execution time management table 153 stores information on execution time of each job for each virtual server 220, specifically, stores execution time of a job corresponding to the machine specifications of each virtual server 220. The machine specifications of the virtual server 220 mentioned herein include the performances of a processor and a memory, and the type of an OS allocated to the virtual server 220. The job execution time management table 153 will be described in detail later by referring to FIG. 11.

The allocation management table 154 stores information used to change a destination of allocation of a job in response to occurrence of a failure. The allocation management table 154 will be described in detail later by referring to FIG. 12.

While shown to be stored in the memory 410 in the example of FIG. 2, each DB may be stored in an external device such as a storage system. In this case, the job management server 100 reads each DB from the storage system (not shown in the drawings), and stores each DB thereby read into the memory 410.

The input-output interface 420 is an interface to establish connection to an external device such as a storage system. The network interface 430 is an interface to establish connection to each server 200 via a network.

The job management server 100 may include hardware to realize the function of each of the configuration management part 110, the job management part 120, and the failure recovery part 130.

FIG. 3 is a block diagram illustrating an exemplary hardware configuration and an exemplary software configuration of the server 200 according to the embodiment of this invention.

The server 200 includes a processor 500, a memory 510, an input-output interface 520, a network interface 530, and a disk device 540.

The processor 500 executes a program stored in the memory 510. Execution of the program by the processor 500 can realize the function of the server 200.

The memory 510 stores the program to be executed by the processor 500 and information required to execute this program. The memory 510 stores the virtualization controller 210. The memory 510 further stores a plurality of instances of the virtual server 220 to be controlled by the virtualization controller 210.

The virtual server 220 includes the OS 230 to execute one or more jobs 240.

The input-output interface 520 is an interface to establish connection to an external device such as a storage system. The network interface 530 is an interface to establish connection to the job management server 100 via a network.

The disk device 540 is a recording medium to store data of various types. The disk device 540 may be a HDD, for example. The server 200 may include a recording medium other than the disk device 540 such as an SSD.

Figure 4:
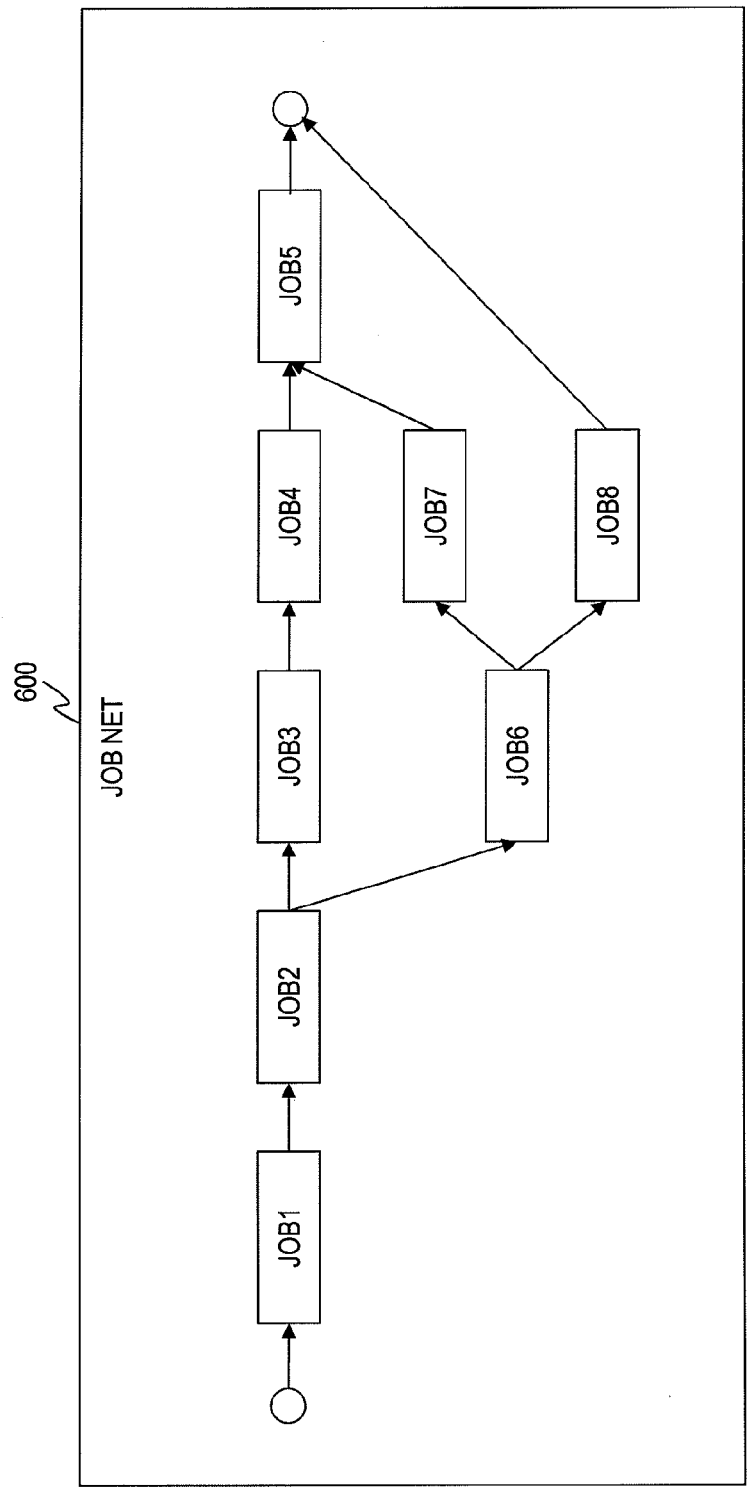
FIG. 4 is an explanatory diagram illustrating an example of a job net according to the embodiment of this invention.

FIG. 4 is an explanatory diagram illustrating an example of a job net according to the embodiment of this invention.

A job net 600 is a group comprising a plurality of jobs and designating the order in which each of the plurality of jobs is executed. In this embodiment, one job net 600 corresponds to one task.

In the example of FIG. 4, the job net 600 branches into a job 3 or a job 6 after execution of a job 2. This means that the job net 600 is a job net where the job 3 or 6 is to be executed or the jobs 3 and 6 are executed in parallel if a predetermined condition is satisfied.

The example of FIG. 4 includes three paths each indicating an execution path from start of a job to end of a job. A first path is a path where a job 1, the job 2, the job 3, a job 4, and the job 5 are executed in this order. A second path is a path where the jobs 1, 2, 6, 7, and 5 are executed in this order. A third path is a path where the jobs 1, 2, 6, and 8 are executed in this order.

In the example shown in this embodiment, an administrator of the job management server 100 registers a predetermined job net in advance.

A table stored in each DB is described next.

FIG. 5 is an explanatory diagram illustrating an example of the physical configuration management table 141 according to the embodiment of this invention.

The physical configuration management table 141 includes a server name 701, a virtualization controller name 702, a processor 703, a memory 704, and a storage capacity 705.

The server name 701 stores an identifier to identify the server 200 uniquely.

The virtualization controller name 702 stores an identifier of the virtualization controller 210 of the server 200 corresponding to the server name 701.

The processor 703 stores information about the performance of the processor 500 of the server 200 corresponding to the server name 701. The information mentioned herein about the performance of the processor 500 indicates a frequency and the number of cores. The information about the performance of the processor 500 may include different information.

The memory 704 stores information about the performance of the memory 510 of the server 200 corresponding to the server name 701. The information mentioned herein about the performance of the memory 510 indicates a memory capacity. The information about the performance of the memory 510 may include different information.

The storage capacity 705 stores information about the performance of the disk device 540 of the server 200 corresponding to the server name 701. The information mentioned herein about the performance of the disk device 540 indicates the storage capacity of the disk device 540. The information about the performance of the disk device 540 may include different information.

FIG. 6 is an explanatory diagram illustrating an example of the virtual configuration management table 142 according to the embodiment of this invention.

The virtual configuration management table 142 includes a virtual server name 801, a server name 802, an OS 803, a processor 804, a memory 805, a storage capacity 806, and a status 807.

The virtual server name 801 stores an identifier to identify the virtual server 220 uniquely.

The server name 802 stores an identifier to identify the server 200 uniquely where the virtual server 220 corresponding to the virtual server name 801 is generated. The server name 802 is the same as the server name 701.

The OS 803 stores an identifier to identify the OS 230 of the virtual server 220 corresponding to the virtual server name 801.

The processor 804 stores information about the performance of a processor allocated to the virtual server 220 corresponding to the virtual server name 801. More specifically, the processor 804 stores a frequency and the number of cores. The information about the performance of the processor allocated to the virtual server 220 may include different information.

The memory 805 stores information about the performance of a memory allocated to the virtual server 220 corresponding to the virtual server name 801. More specifically, the memory 805 stores a memory capacity. The information about the performance of the memory allocated to the virtual server 220 may include different information.

The storage capacity 806 stores information about the performance of a storage area allocated to the virtual server 220 corresponding to the virtual server name 801. More specifically, this information indicates the capacity of the storage area. The information about the performance of the storage area allocated to the virtual server 220 corresponding to the virtual server name 801 may include different information.

The status 807 stores information about a running status of the virtual server 220 corresponding to the virtual server name 801. More specifically, the status 807 stores one of "resource reserved," "being generated," "unused," "reserved," "in use," and "being erased."

"Resource reserved" indicates a status where a resource to be allocated to the virtual server 220 is reserved. "Being generated" indicates a status where the virtual server 220 is being generated.

"Unused" indicates a status where a job is not allocated. "Reserved" indicates a status where a job is allocated to the generated virtual server 220 and this job has not been executed. "In use" indicates a status where the generated virtual server 220 is executing a job.

"Being erased" means a status where the generated virtual server 220 is being erased. Erasing the virtual server 220 can release a physical resource having been allocated from this virtual server 220, so that a free resource can be secured.

FIG. 7 is an explanatory diagram illustrating an example of the deployment execution time management table 143 according to the embodiment of this invention.

The deployment execution time management table 143 includes a server name 901, an OS 902, and deployment time 903.

The server name 901 stores an identifier to identify the server 200 uniquely. The server name 901 is the same as the server name 701.

The OS 902 stores an identifier of the OS 230 of the virtual server 220 generated on the server 200 corresponding to the server name 901. The OS 902 is the same as the OS 803.

The deployment time 903 stores time required for deployment process performed by the server 200 corresponding to the server name 901.

FIG. 8 is an explanatory diagram illustrating an example of the free resource management table 144 according to the embodiment of this invention.

The free resource management table 144 includes a server name 1001, a processor 1002, a memory 1003, and a storage capacity 1004.

The server name 1001 stores an identifier to identify the server 200 uniquely. The server name 1001 is the same as the server name 701.

The processor 1002 stores information about the performance of an unallocated processor 500 that is one of the processors 500 of the servers 200 corresponding to the server name 1001. The processor 1002 stores a value obtained by subtracting the processor 804 from the processor 703. As an example, if two virtual servers 220 having a frequency of "2 GHz" and the number of cores of "two" allocated to each of these virtual servers 220 are generated on the server 200 including a processor with a frequency of "2 GHz" and the number of cores of "eight", the processor 1002 stores "8 GHz."

The memory 1003 stores information about the performance of an unallocated memory 510 that is one of the memories 510 of the servers 200 corresponding to the server name 1001. The memory 1003 stores a value obtained by subtracting the memory 805 from the memory 704.

The storage capacity 1004 stores information about the performance of the disk device 540 unallocated to the virtual server 220 that is one of the disk devices 540 of the servers 200 corresponding to the server name 1001.

FIG. 9 is an explanatory diagram illustrating an example of the job net configuration management table 151 according to the embodiment of this invention.

The job net configuration management table 151 includes a job net name 1101, a job name 1102, a related job 1103, a job start condition 1104, and execution limit time 1105.

The job net name 1101 stores an identifier to identify a job net uniquely.

The job name 1102 stores an identifier of the job 240 in a job net corresponding to the job net name 1101.

The related job 1103 stores an identifier of the job 240 to be started after execution of the job 240 corresponding to the job name 1102. If process is to be completed after execution of the job 240 corresponding to the job name 1102, the related job 1103 stores "EXIT" indicating completion of the process.

The job start condition 1104 stores a condition for start of the job 240 corresponding to the related job 1103. If there is no start condition, the job start condition 1104 stores information indicating that there is no start condition.

The execution limit time 1105 stores information about a time limit for process on a job net corresponding to the job net name 1101. While execution time of the process is shown in the example of FIG. 5, the execution limit time 1105 may store temporal information such as "twelve midnight."

FIG. 10 is an explanatory diagram illustrating an example of the job net execution management table 152 according to the embodiment of this invention.

The job net execution management table 152 includes a job net name 1201, a job name 1202, a virtual server name 1203, a status 1204, elapsed time 1205, and a return value 1206.

The job net name 1201 stores an identifier to identify a job net uniquely. The job net name 1201 is the same as the job net name 1101.

The job name 1202 stores an identifier of the job 240 in a job net corresponding to the job net name 1201. The job name 1202 is the same as the job name 1102.

The virtual server name 1203 stores an identifier to uniquely identify the virtual server 220 to execute the job 240 corresponding to the job name 1202. Specifically, the virtual server name 1203 stores an identifier of the virtual server 220 to which the job 240 has been allocated.

The status 1204 stores information indicating an execution status of the job 240 corresponding to the job name 1202. More specifically, the status 1204 stores "ready to be executed," "active," "successful completion," "abnormal completion," and the like. In the case of "abnormal completion," information such as "unhandled," "being handled" or "already handled" may be stored as information indicating an execution status of failure recovery processing responsive to this abnormality.

The elapsed time 1205 stores execution time of the job 240 corresponding to the job name 1202. If the status 1204 is "successful completion," the elapsed time 1205 stores execution time from start to end of the job 240. If the status is "abnormal completion," the elapsed time 1205 stores execution time from start of the job 240 until occurrence of the abnormality. If the status 1204 is "ready to be executed" or "active," the elapsed time 1205 does not store any value.

The return value 1206 stores a return value to be output in response to execution of the job 240 corresponding to the job name 1202.

FIG. 11 is an explanatory diagram illustrating an example of the job execution time management table 153 according to the embodiment of this invention.

The job execution time management table 153 includes a job name 1301, machine specifications 1302, and execution time 1303.

The job name 1301 stores an identifier to identify the job 240 uniquely.

The machine specifications 1302 store information about the performance of the virtual server 220 to execute the job 240 corresponding to the job name 1301. The machine specifications 1302 include an OS 1304, a processor 1305, and a memory 1306.

The OS 1304 stores an identifier of the OS 230 of the virtual server 220. The processor 1305 stores information about the performance of a processor allocated to the virtual server 220. The memory 1306 stores information about the performance of a memory allocated to the virtual server 220.

The execution time 1303 stores execution time determined if the virtual server 220 having machine specifications defined by the machine specifications 1302 executes the job 240 corresponding to the job name 1301.

The job execution time management table 153 may be generated based on an execution history of the job 240, or may be configured in advance by an administrator. After being configured in advance by the administrator, the job execution time management table 153 may be updated each time an execution history of a job is collected by the job management server 100.

FIG. 12 is an explanatory diagram illustrating an example of the allocation management table 154 according to the embodiment of this invention.

The allocation management table 154 includes a path name 1401, a job name 1402, a status 1403, elapsed time 1404, expected completion time 1405, expected completion time 1406, and machine specifications 1407.

The path name 1401 stores an identifier to identify a path in a job net uniquely.

The job name 1402 stores an identifier to identify the job 240 uniquely in a path corresponding to the path name 1401. The job name 1402 stores identifiers in the order in which the jobs 240 are executed.

The status 1403 stores an execution status of the job 240 corresponding to the job name 1402. The status 1403 is the same as the status 1204.

The elapsed time 1404 stores execution time of the job 240 corresponding to the job name 1402. The elapsed time 1404 is the same as the elapsed time 1205.

The expected completion time 1405 stores expected time during which the job 240 corresponding to the job name 1402 is completed. The expected completion time 1405 stores expected time determined before allocation of the job 240 is changed in response to occurrence of a failure.

If the status 1403 is "successful completion," the expected completion time 1405 stores a value same as that of the elapsed time 1404.

If the status 1403 is "failure," the expected completion time 1405 stores a total of the value of the elapsed time 1404, deployment time for the virtual server 220, and execution time of the job 240.

The deployment time for the virtual server 220 is the value of the deployment time 903 in the deployment execution time management table 143. The execution time of the job 240 is the value of the execution time 1303 in the job execution time management table 153.

If the status 1403 is "ready to be executed," the expected completion time 1405 stores execution time of the job 240, specifically, the value of the execution time 1303 in the job execution time management table 153.

The expected completion time 1406 stores expected time during which this job 240 corresponding to the job name 1402 is completed, in a case where this job is allocated to the new virtual server 220 in response to occurrence of a failure. The expected completion time 1406 stores the value of the execution time 1303 in the job execution time management table 153.

The machine specifications 1407 store information about the performance of the virtual server 220 determined after allocation change of the job 240.

Processing of this invention is described next.

Figure 13:
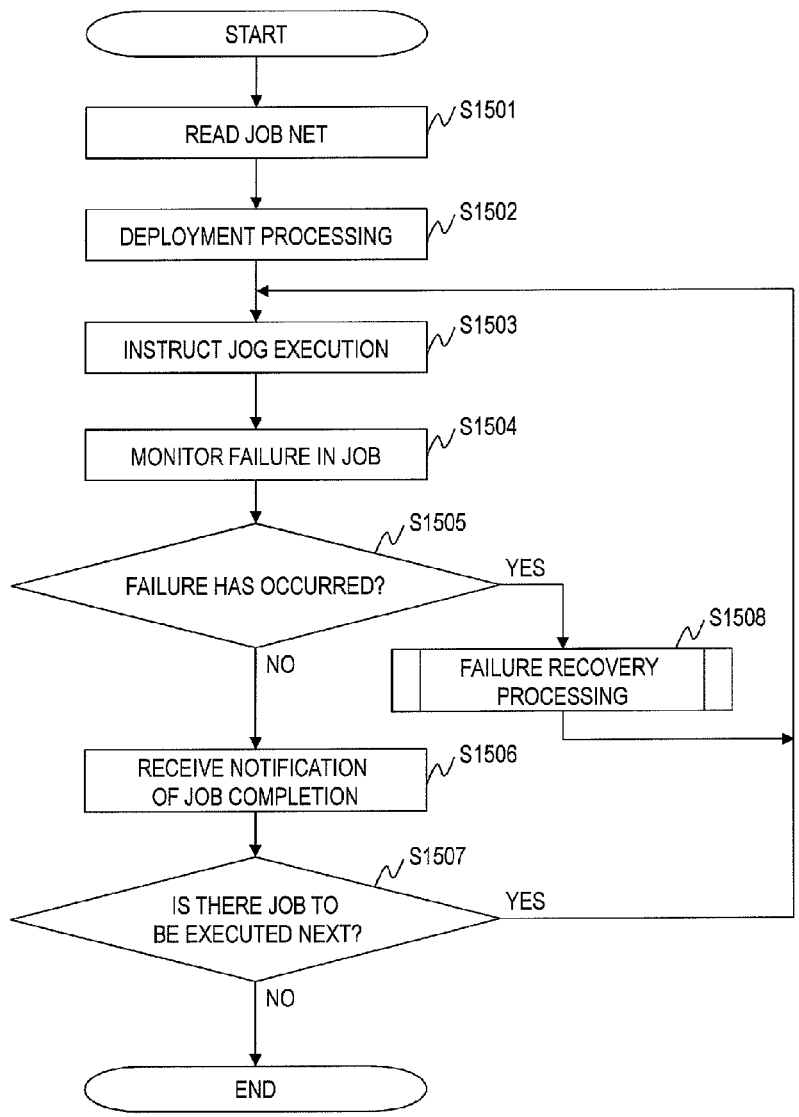
FIG. 13 is a flowchart explaining an outline of a processing in the embodiment of this invention.

FIG. 13 is a flowchart explaining an outline of the processing in the embodiment of this invention.

In order to start processing on a job net corresponding to a certain task, the job management server 100 reads information on the corresponding job net from the job net configuration management table 151 (step S1501).

The job management server 100 starts the processing in a case where an instruction to start the job net is input from an administrator, or in a case where time to start the job net has come.

The job management server 100 performs deployment processing on the job 240 in this job net based on the read information on the job net (step S1502).

More specifically, the job management server 100 determines the virtual server 220 to which the job 240 included in the job net is to be allocated, and allocates the job 240 to each virtual server 220. The deployment processing on the job 240 can be performed by a publicly known method, thus descriptions thereof will be omitted.

Hereafter, the virtual server 220 to which the job 240 is allocated is also described as an execution virtual server 220.

The job management server 100 instructs the execution virtual server 220 to execute the job 240 (step S1503).

In the case of the job net 600 shown in FIG. 8, for example, the job management server 100 first instructs the virtual server 220 to which the job 1 is allocated to execute this job 1. The virtual server 220 having received this instruction for execution starts to execute the job 1.

The job management server 100 monitors whether a failure has occurred in the active job 240 (step S1504).

A failure in the job 240 can be managed in the following methods, for example. In one method, the job management server 100 inquires to the execution virtual server 220. In another method, the job management server 100 receives a notification of occurrence of a failure from the execution virtual server 220. However, this invention is not intended to be limited to these methods of monitoring a failure.

The job management server 100 determines whether a failure has occurred in the active job 240 (step S1505). Specifically, it is determined whether a failure of the active job 240 has been detected.

In a case where a failure has not occurred in the active job 240, the job management server 100 receives a notification of completion of the job 240 from the execution virtual server 220 (step S1506). This notification of completion includes a return value indicating a result of execution of the job 240.

At this time, the job management server 100 may present to the administrator information to be used to determine whether the execution virtual server 220 having completed the job 240 is to be deleted. Deleting the virtual server 220 increases a free resource. In contrast, in a case where the virtual server 220 remains undeleted this virtual server 220 becomes usable as the virtual server 220 to which a different job 240 is to be allocated. The job management server 100 may automatically delete the execution virtual server 220 having completed the job 240.

The job management server 100 determines whether there is the job 240 to be executed next, based on the read information on the job net (step S1507). The job management server 100 can determine whether there is the job 240 to be executed next based on the information on the job net and the return value in the notification of completion of the job 240.

In a case where it is determining that there is the job 240 to be executed next, the job management server 100 returns to step S1503 and instructs the execution virtual server 220 to execute the next job 240.

In a case where it is determining that there is no job 240 to be executed next, the job management server 100 completes the processing.

In a case a failure has occurred in the active job 240 in step S1505, the job management server 100 performs failure recovery processing (step S1508).

According to the aforementioned processing, the job management server 100 can move the plurality of jobs 240 including the job 240 having been executed on the execution virtual server 220 where the failure has occurred to the new virtual server 220. The failure recovery processing will be described in detail later by referring to FIG. 14.

Figure 14:
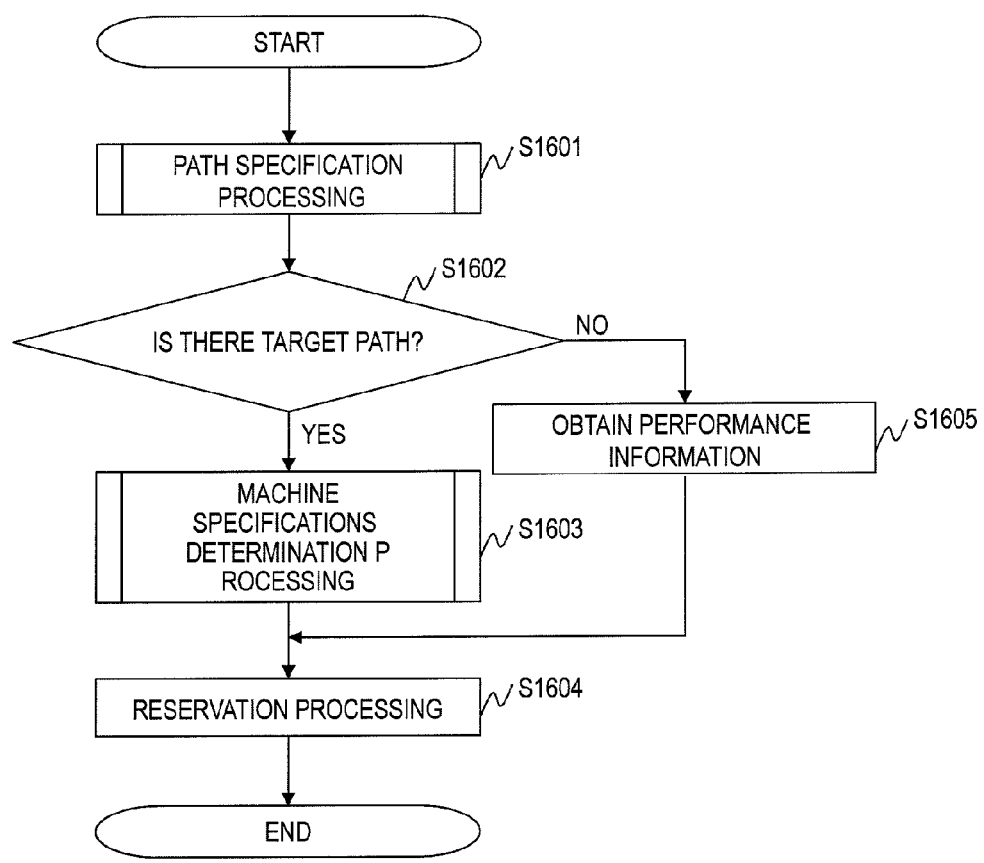
FIG. 14 is a flowchart explaining in detail a failure recovery processing in the embodiment of this invention.

FIG. 14 is a flowchart explaining in detail the failure recovery processing in the embodiment of this invention.

The failure recovery part 130 having detected the failure in the execution virtual server 220 performs the failure recovery processing.

The failure recovery part 130 performs path specification processing to specify a target path (step S1601). The target path mentioned herein means a path included in the job net and which contains jobs all of which are not to be completed within the execution limit time 1105. The path specification processing will be described in detail later by referring to FIG. 15.

The failure recovery part 130 determines whether there is the target path based on a result of the path specification processing (step S1602). The reason for this is that, in a case where there is the target path, moving the job 240 in this target path should be considered.

In a case where it is determined that there is the target path, the failure recovery part 130 performs machine specifications determination processing (S1603). The machine specifications determination processing determines machine specifications of the virtual server 220 required to complete all the jobs 240 in the path within the execution limit time 1105. The machine specifications determination processing will be described in detail later by referring to FIGS. 16A and 16B.

Hereafter, the machine specifications of the virtual server 220 determined in step S1603 are also described as required machine specifications. Further, the virtual server 220 to which the job 240 to be newly allocated is also described as a new virtual server 220.

The failure recovery part 130 performs reservation processing on the new virtual server 220 based on the required machine specifications (step S1604), and completes the processing. The reservation processing will be described in detail later by referring to FIG. 18.

In a case where it is determined that there is no target path in step S1602, the failure recovery part 130 obtain information on the performance of the execution virtual server 220 where the failure has occurred (step S1605).

More specifically, the failure recovery part 130 refers to the job net execution management table 152 based on an identifier of the job net and an identifier of the job 240 to specify the execution virtual server 220 where the failure has occurred. Further, the failure recovery part 130 refers to the virtual configuration management table 142 based on the identifier of the execution virtual server 220 to obtain information on the performance of the execution virtual server 220.

The failure recovery part 130 performs the reservation processing based on the obtained information on the performance of the execution virtual server 220 (step S1605) on the new virtual server 220 having the same machine specifications as those of the execution virtual server 220 where the failure has occurred. The machine specifications of the new virtual server 220 are required only to be the same as or higher than those of the execution virtual server 220 where the failure has occurred.

After completing the reservation processing, the failure recovery part 130 generates change information to be used to change allocation of the job 240 to the new virtual server 220. The generated change information is output to the job management part 120. The job management part 120 changes allocation of the job 240 based on the input change information.

Figure 15:
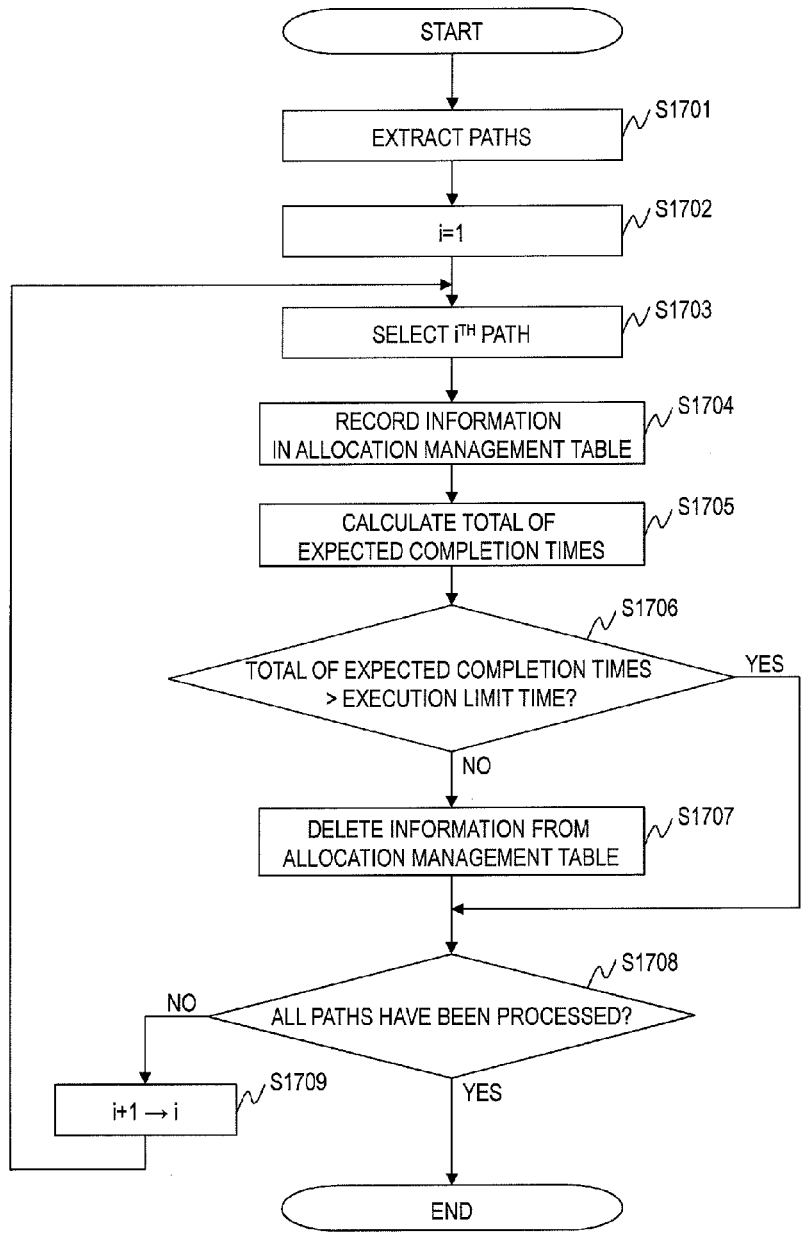
FIG. 15 is a flowchart explaining in detail a path specification processing in the embodiment of this invention.

FIG. 15 is a flowchart explaining in detail the path specification processing in the embodiment of this invention.

The failure recovery part 130 refers to the read information on the job net to extract all paths in this job net (S1701).

More specifically, the failure recovery part 130 extracts all the paths that can branch from the job 240 having been executed on the execution virtual server 220 where the failure has occurred.

By referring, for example, to the job net 600 shown in FIG. 8, in a case where a failure has occurred in the execution virtual server 220 executing the job 2, the following three paths are extracted. Specifically, three paths including a path 1 (jobs 1, 2, 3, 4 and 5), a path 2 (jobs 1, 2, 6, 7 and 5), and a path 3 (jobs 1, 2, 6 and 8) are extracted. If a failure has occurred in the execution virtual server 220 executing the job 6, the aforementioned paths 2 and 3 are extracted.

The failure recovery part 130 assigns an identification number starting with "1" to the extracted path.

The failure recovery part 130 configures the identification number at "1" (step S1702), and selects a first path (step S1703).

Next, the failure recovery part 130 generates an entry corresponding to the selected path in the allocation management table 154 (step S1704). A method of generating the entry is described next by referring to FIGS. 16A and 16B.

Figure 16A:
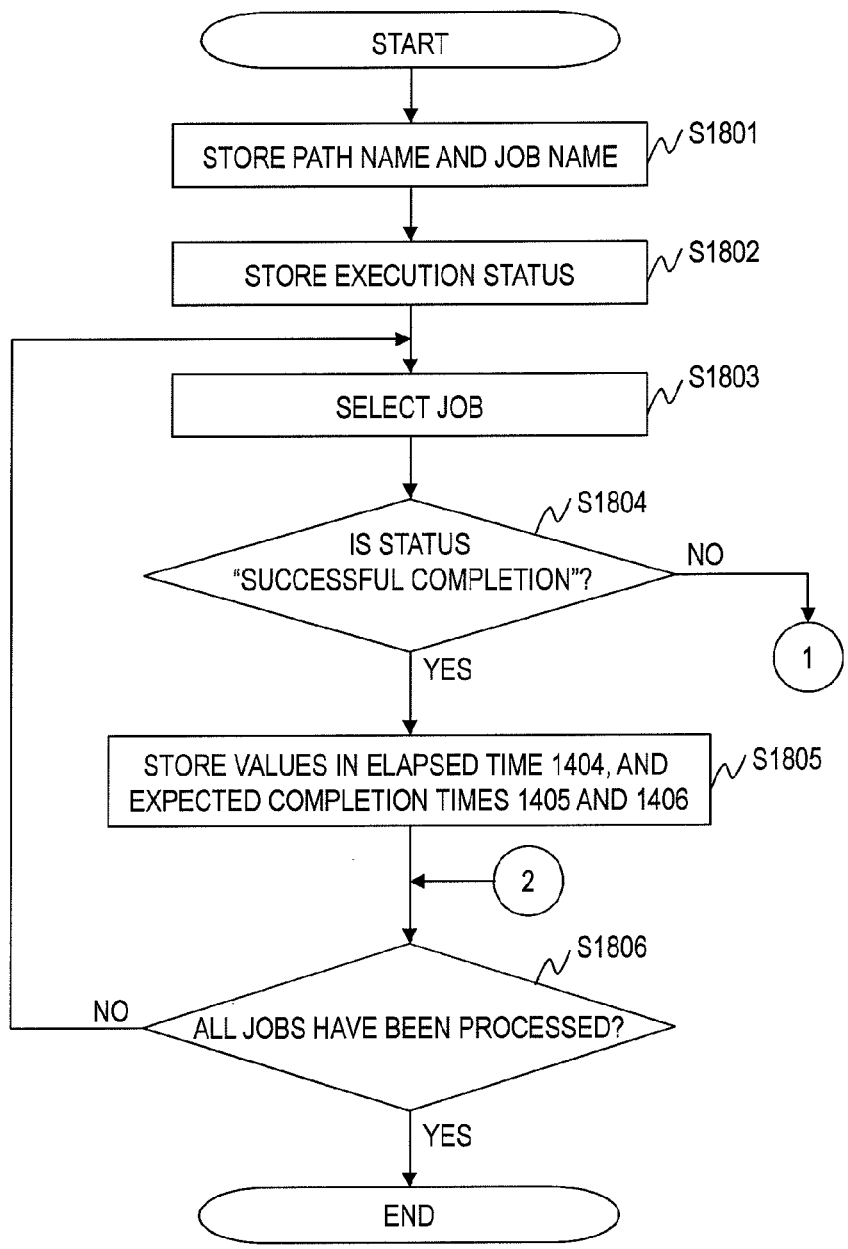
FIGS. 16A and 16B are flowcharts explaining a method of generating an entry in the allocation management table in the embodiment of this invention.
Figure 16B:
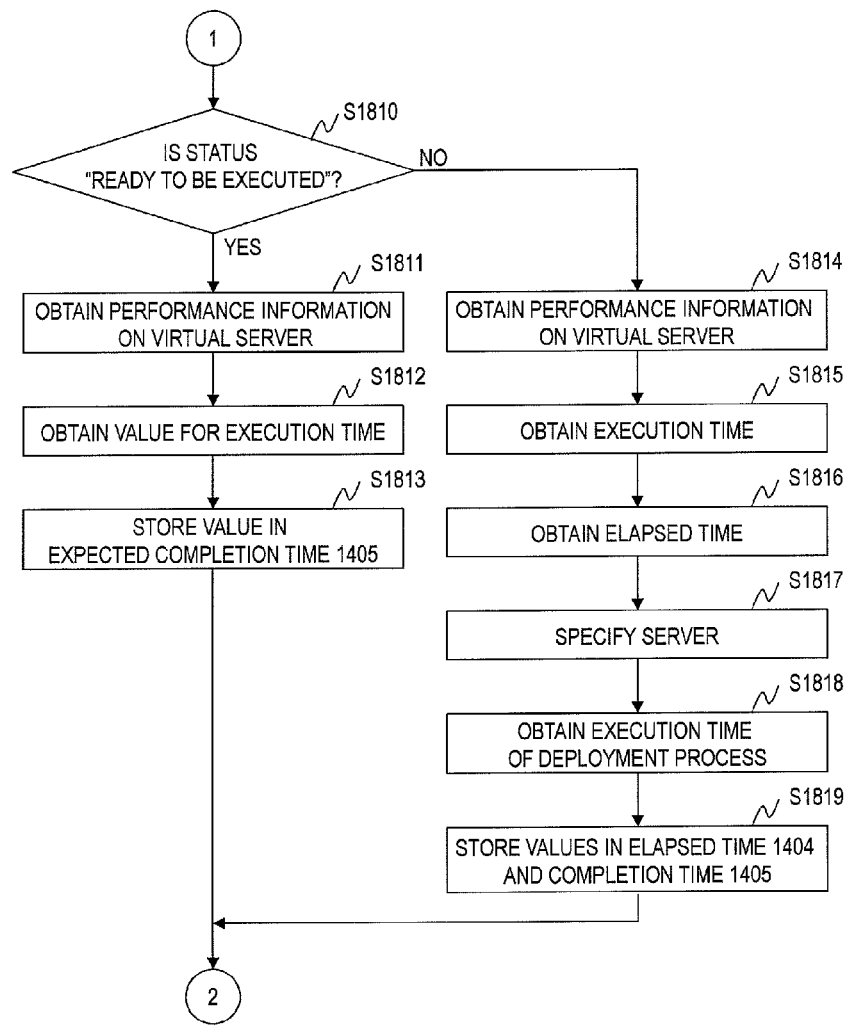

FIGS. 16A and 16B are flowcharts explaining the method of generating an entry in the allocation management table 154 in the embodiment of this invention.

First, the failure recovery part 130 stores necessary information into the path name 1401 and the job name 1402 based on the extracted information on the path (step S1801).

Further, the failure recovery part 130 stores necessary information in the status 1403 by referring to the status 1204 of a corresponding entry in the job net execution management table 152 (step S1802).

Next, the failure recovery part 130 selects one job 240 from the allocation management table 154 (step S1803). Regarding a method of selecting the job 240, the jobs 240 may be selected sequentially from the top of the allocation management table 154.

The failure recovery part 130 determines whether the status 1403 of the selected job 240 is "successful completion" (step S1804).

In a case where it is determined that the status 1403 of the selected job 240 is "successful completion", the failure recovery part 130 stores a value into each of the elapsed time 1404, and the expected completion times 1405 and 1406 (step S1805).

More specifically, the failure recovery part 130 stores the same value as that of the elapsed time 1205 into each of the elapsed time 1404, and the expected completion times 1405 and 1406.

Then, the failure recovery part 130 determines whether all the jobs 240 in the path have been processed (step S1806).

In a case where it is determined that all the jobs 240 in the path have not been processed, the failure recovery part 130 returns to step S1803 to perform the same processing (from step S1803 to step S1819).

In a case where it is determined that all the jobs 240 in the path have been processed, the failure recovery part 130 completes the processing.

In step S1804, in a case where it is determined that the status 1403 of the selected job 240 is not "successful completion", the failure recovery part 130 determines whether the status 1403 of the selected job 240 is "ready to be executed" (step S1810).

In a case where it is determined that the status 1403 of the selected job 240 is "ready to be executed," the failure recovery part 130 obtains information on the performance of the execution virtual server 220 to which this job 240 is allocated (step S1811). More specifically, the failure recovery part 130 performs the following processing.

The failure recovery part 130 refers to the job net execution management table 152 to search for an entry agreeing with the job name 1402. The virtual server name 1203 of this entry shows an identifier of the execution virtual server 220 to which the job 240 corresponding to the job name 1402 is allocated.

Further, the failure recovery part 130 refers to the virtual configuration management table 142 to search for an entry agreeing with the virtual server name 1203. The OS 803, the processor 804, and the memory 805 of this entry correspond to the information on the performance of the execution virtual server 220.

Next, the failure recovery part 130 obtains execution time in a case where the execution virtual server 220 executes the selected job 240 (step S1812).

More specifically, the failure recovery part 130 refers to the job execution time management table 153 to search for an entry agreeing with an identifier of the job 240 and the information on the performance of the execution virtual server 220. The execution time 1303 of this entry corresponds to the execution time of the selected job 240.

The failure recovery part 130 stores the obtained execution time 1303 into the expected completion time 1405 (step S1813), and then proceeds to step S1816. Also the status 1403 of an entry is "ready to be executed," values are not stored in the elapsed time 1404 and the expected completion time 1406 of this entry.

In step S1810, in a case where it is determined that the status 1403 of the selected job 240 is not "ready to be executed," specifically, that the status 1403 of the selected job 240 is "failure," the failure recovery part 130 obtains information on the performance of the execution virtual server 220 to which this job 240 is allocated (step S1814). This processing is the same as the processing in step S1811.

The failure recovery part 130 obtains execution time of the job 240 based on the obtained information on the performance of the execution virtual server 220 (step S1815). This processing is the same as the processing in step S1812.

The failure recovery part 130 obtains elapsed time from start of the job 240 until occurrence of a failure (step S1816).

More specifically, the failure recovery part 130 refers to the job net execution management table 152 to search for an entry agreeing with an identifier of the job 240. The elapsed time 1205 of this entry corresponds to elapsed time from start of the job 240 until occurrence of the failure.

The failure recovery part 130 specifies the server 200 where the execution virtual server 220 is running (step S1817).

More specifically, the failure recovery part 130 refers to the virtual configuration management table 142 to search for an entry agreeing with an identifier of the execution virtual server 220. The server name 802 of this entry corresponds to an identifier of the server 200 where the execution virtual server 220 is running.

The failure recovery part 130 obtains execution time of deployment processing on the job 240 (step S1818).

More specifically, the failure recovery part 130 refers to the deployment execution time management table 143 to search for an entry agreeing with the server name 802. The deployment time 903 of this entry corresponds to execution time of the deployment processing on the job 240.

The failure recovery part 130 stores values in the elapsed time 1404 and the expected completion time 1405 based on the obtained information (step S1819), and then proceeds to step S1806.

More specifically, the failure recovery part 130 stores the obtained value of the execution time 1303 into the elapsed time 1404. Further, the failure recovery part 130 sums up the obtained elapsed time 1205, the obtained execution time 1303 and the obtained deployment time 903, and stores the resultant total into the expected completion time 1405.

This is the end of explanation of step S1704, and the explanation continues by referring back to FIG. 15.

The failure recovery part 130 calculates a total of the expected completion times 1405 of all the jobs 240 included in the path (step S1705), and determines whether the calculated total exceeds the execution limit time 1105 (step S1706). Specifically, the failure recovery part 130 determines whether the processing on the job net is to be completed within execution limit time if only the job 240 where a failure has occurred is moved.

Also the execution limit time 1105 is designated by a time point, the following determination method is applicable. The failure recovery part 130 calculates an end time point of the job net by adding the calculated total to a start time point of the job net. The failure recovery part 130 determines whether the calculated end time point comes after a time point indicated as the execution limit time 1105.

In a case where it is determined that the calculated total exceeds the execution limit time 1105, the failure recovery part 130 proceeds to step S1708.

In a case where it is determined that the calculated total does not exceed the execution limit time 1105, the failure recovery part 130 deletes the entry of the path from the allocation management table 154 (step S1707).

The failure recovery part 130 determines whether all the paths have been processed (step S1708).

In a case where it is determined that all the paths have not been processed, the failure recovery part 130 increments the identification number of a path by "1" and returns to step S1703, and performs the same processing (from step S1703 to step S1709).

In a case where it is determined that all the paths have been processed, the failure recovery part 130 completes the processing.

Figure 17A:
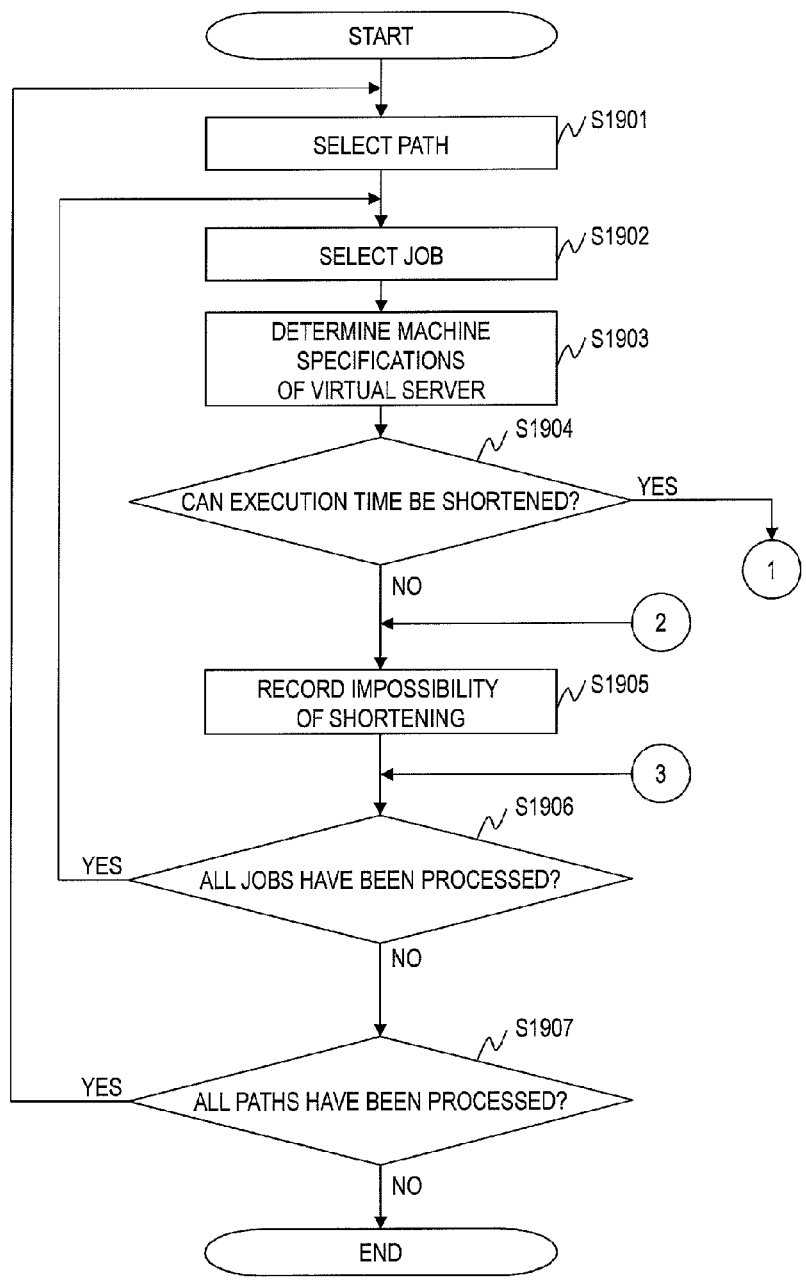
FIGS. 17A and 17B are flowcharts showing in detail a machine specifications determination processing in the embodiment of this invention.
Figure 17B:
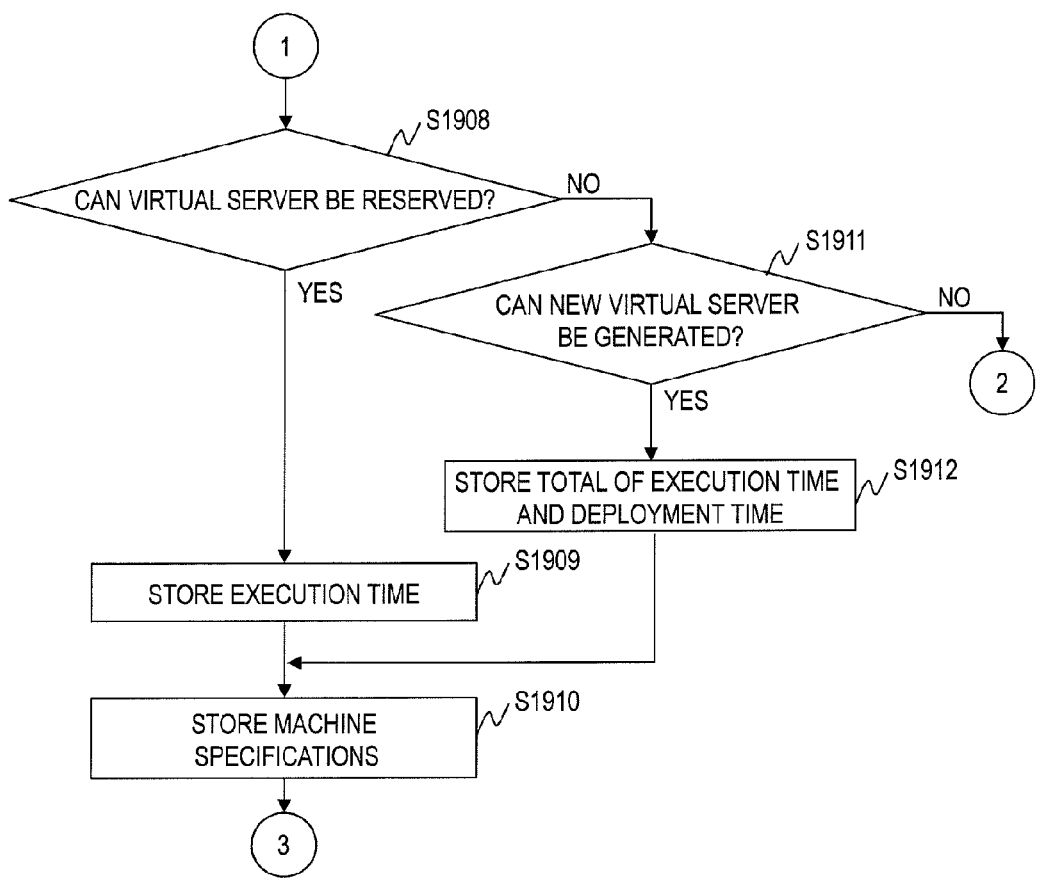

FIGS. 17A and 17B are flowcharts showing in detail the machine specifications determination processing in the embodiment of this invention.

The failure recovery part 130 selects one path from the allocation management table 154 (step S1901).

The failure recovery part 130 selects one job 240 as a search target from the jobs 240 included in the selected path (S1902). The search target job 240 mentioned herein indicates an entry with the status 1403 that is either "failure" or "ready to be executed." Here below, the job 240 selected in step S1902 may also be described as a target job.

The failure recovery part 130 refers to the job execution time management table 153 to determine the machine specifications of the new virtual server 220 to which the target job 240 is to be allocated (step S1903). Specifically, the failure recovery part 130 determines required machine specifications. More specifically, the failure recovery part 130 performs the following processing.

The failure recovery part 130 searches the job execution time management table 153 for an entry agreeing with the job name 1402 of the target job 240. The failure recovery part 130 determines whether the execution time 1303 of the searched entry is shorter than the expected completion time 1405 of the target job 240.

In a case where it is determined that the execution time 1303 of the searched entry is shorter than the expected completion time 1405 of the target job 240, the failure recovery part 130 determines the machine specifications 1302 of this entry as the required machine specifications. A plurality of required machine specifications may be determined.

Next, the failure recovery part 130 determines whether execution time can be shortened (step 1904).

More specifically, the failure recovery part 130 determines whether one or more required machine specifications are determined in step S1903. In a case where the required machine specifications are not determined, specifically there is no entry with the execution time 1303 of the searched entry shorter than the expected completion time 1405 of the target job 240, the failure recovery part 130 determines that execution time cannot be shortened.

In a case where it is determined that execution time cannot be shortened, the failure recovery part 130 stores "shortening impossible" into the machine specifications 1407 of an entry corresponding to the target job 240 (step S1905). Further, the failure recovery part 130 stores the same value as that of the expected completion time 1405 into the expected completion time 1406.

In a case where it is determined that execution time can be shortened, the failure recovery part 130 refers to the virtual configuration management table 142 to determine whether the virtual server 220 that satisfies the machine specifications of the new virtual server 220, specifically, the required machine specifications (machine specifications 1302) can be reserved (step S1908).

In this processing, the failure recovery part 130 determines whether there is the virtual server 220 satisfying the required machine specifications (machine specifications 1302) and at the same time, which is available. More specifically, the failure recovery part 130 performs the following processing.

The failure recovery part 130 refers to the virtual configuration management table 142 to search for the virtual server 220 satisfying the required machine specifications (machine specifications 1302). In this embodiment, the failure recovery part 130 searches for the virtual server 220 having the same machine specifications as those of the required machine specifications (machine specifications 1302). This invention is not intended to be limited thereto and the virtual server 220 having machine specifications same as or higher than those of the required machine specifications (machine specifications 1302) may be searched for.

In a case where there is no virtual server 220 satisfying the required specifications (machine specifications 1302), the failure recovery part 130 determines that the new virtual server 220 cannot be reserved.

In a case where it is determined that there is the virtual server 220 satisfying the required machine specifications (machine specifications 1302), the failure recovery part 130 determines whether the status 807 of an entry corresponding to the searched virtual server 220 is "unused." Alternatively, the failure recovery part 130 may determine whether the status 807 of this entry is "being generated."

In a case where the status 807 of the entry corresponding to the searched virtual server 220 is not "unused," the failure recovery part 130 determines that the virtual server 220 cannot be reserved. In contrast, in a case where the status 807 of the entry corresponding to the searched virtual server 220 is "unused," the failure recovery part 130 determines that the virtual server 220 can be reserved.

Also a plurality of required machine specifications are determined in step S1903, information on required machine specifications with the highest machine specifications may be stored. This invention is not intended to be limited thereto and information on different required machine specifications may be stored.

In a case where it is determined that the virtual server 220 satisfying the required machine specifications (machine specifications 1302) can be reserved, the failure recovery part 130 stores the value of the execution time 1303 of an entry corresponding to the new virtual server 220 into the expected completion time 1406 of the entry corresponding to the target job 240 (step S1909).

Further, the failure recovery part 130 stores information on the required machine specifications (machine specifications 1302) into the machine specifications 1407 of the entry corresponding to the target job 240 (step S1910), and then proceeds to step S1906.

In step S1908, in a case where it is determined that the virtual server 220 satisfying the required machine specifications (machine specifications 1302) cannot be reserved, the failure recovery part 130 determines whether the virtual server 220 satisfying the required machine specifications (machine specifications 1302) can be generated (step S1911). Specifically, the failure recovery part 130 determines whether the new virtual server 220 can be generated.

More specifically, the failure recovery part 130 refers to the free resource management table 144 to determine whether there is a free resource required to generate the new virtual server 220.

In a case where there is no free resource required to generate the new virtual server 220, the failure recovery part 130 determines that the new virtual server 220 cannot be generated. In contrast, in a case where there is a free resource required to generate the new virtual server 220, the failure recovery part 130 determines that the new virtual server 220 can be generated. In this case, the failure recovery part 130 obtains an identifier of the server 200 where the new virtual server 220 can be generated.

In a case where it is determined that the new virtual server 220 cannot be generated, the failure recovery part 130 stores "shortening impossible" into the machine specifications 1407 of the entry corresponding to the target job 240 (step S1905). Further, the failure recovery part 130 stores the same value as that of the expected completion time 1405 into the expected completion time 1406.

In a case where it is determined that the new virtual server 220 can be generated, the failure recovery part 130 stores a total of the execution time 1303 and the deployment time 903 into the expected completion time 1406 (step S1912), and then proceeds to step S1910.

The deployment time 903 is the deployment time 903 of an entry agreeing with the obtained identifier of the server 200.

The failure recovery part 130 determines whether all the jobs 240 in the selected path have been processed (step S1906).

In a case where it is determined that all the jobs 240 in the selected path have not been processed, the failure recovery part 130 returns to step S1902 to select the next job 240 and performs the same processing (from step S1902 to step S1908).

In a case where it is determined that all the jobs 240 in the selected path have been processed, the failure recovery part 130 determines whether all the paths in the allocation management table 154 have been processed (step S1907).

In a case where it is determined that all the paths in the allocation management table 154 have not been processed, the failure recovery part 130 selects a next path from the allocation management table 154 (step S1901), and performs the same processing (from step S1901 to step 1908).

In a case where it is determined that all the paths in the allocation management table 154 have been processed, the failure recovery part 130 completes the processing.

As a result of the aforementioned processing, necessary information is stored in all the columns of the allocation management table 154.

Figure 18:
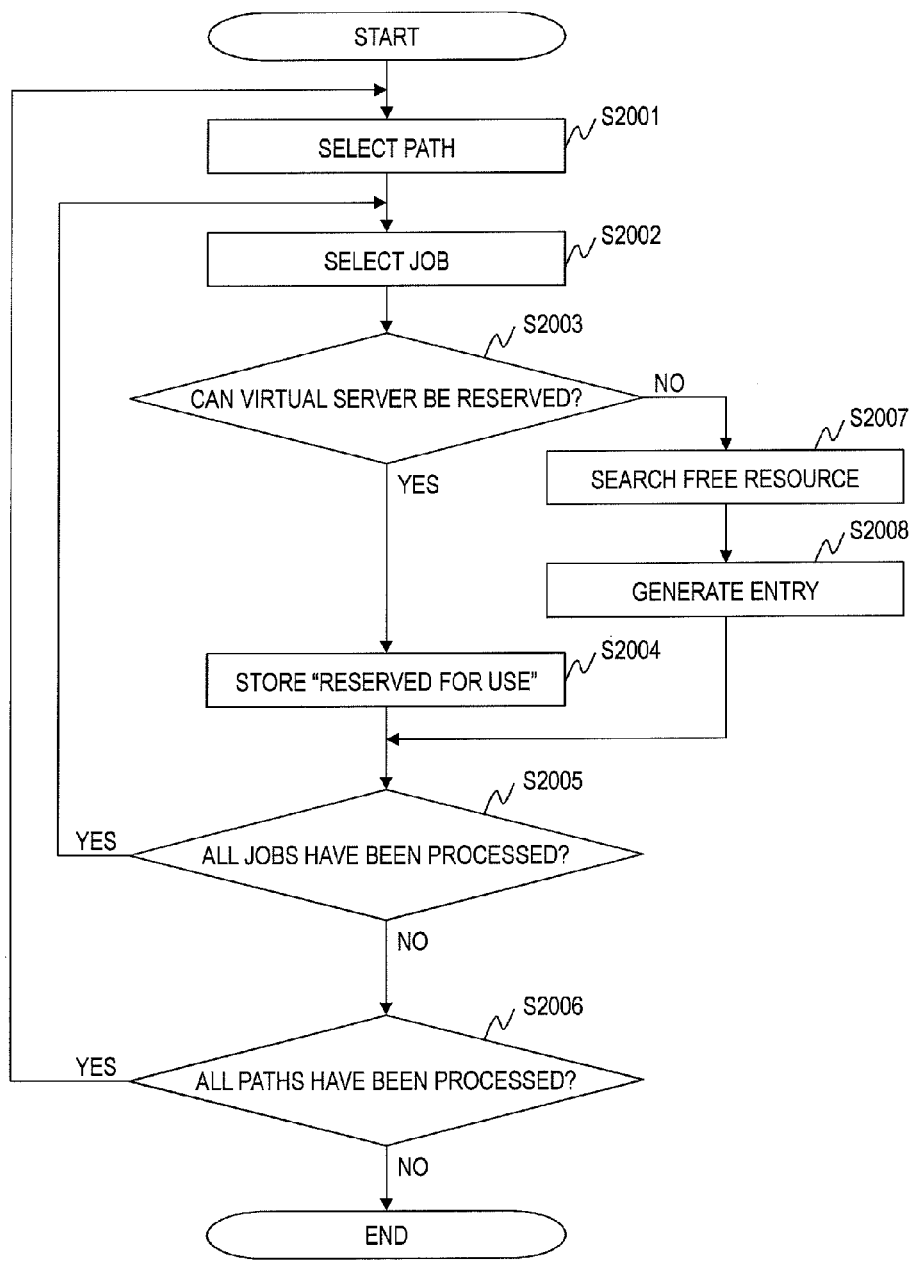
FIG. 18 is a flowchart explaining in detail a reservation processing in the embodiment of this invention.

FIG. 18 is a flowchart explaining in detail the reservation processing in the embodiment of this invention.

The failure recovery part 130 selects one path from the allocation management table 154 (step S2001). This processing is the same as the processing in step S1901. The failure recovery part 130 selects one search target job 240 from the jobs 240 included in the selected path (step S2002).

More specifically, the failure recovery part 130 selects an entry storing required machine specifications in the machine specifications 1407.

The failure recovery part 130 determines whether the virtual server 220 satisfying the machine specifications 1407 of the selected entry can be reserved (step S2003). This processing is the same as the processing in step S1908. The failure recovery part 130 may use a result of the determination in step S1908.

In a case where it is determined that the virtual server 220 satisfying the machine specifications 1407 can be reserved, the failure recovery part 130 changes the status 807 of an entry corresponding to this virtual server 220 to "reserved for use" (step S2004). Further, the failure recovery part 130 generates change information to be used to change allocation of the job 240 to this virtual server 220, and outputs the change information to the job management part 120. The change information includes at least an identifier of the virtual server 220 and an identifier of the job 240.

In response to input of the change information, the job management part 120 changes allocation of the job 240 based on this change information.

The failure recovery part 130 determines whether all the jobs 240 included in the selected path have been processed (step S2005).

In a case where it is determined that all the jobs 240 included in the selected path have not been processed, the failure recovery part 130 returns to step S2002, selects the next job 240, and performs the same processing (from step S2002 to step S2009).

In a case where it is determined that all the jobs 240 in the selected path have been processed, the failure recovery part 130 determines whether all the paths in the allocation management table 154 have been processed (step S2006).

In a case where it is determined that all the paths in the allocation management table 154 have been processed, the failure recovery part 130 selects a next path from the allocation management table 154 (step S2001), and performs the same processing (from step S2001 to step 2009).

In step S2003, in a case where it is determined that the virtual server 220 satisfying the machine specifications 1407 cannot be reserved, the failure recovery part 130 refers to the free resource management table 144 to search for the server 200 that can generate the new virtual server 220 (step S2007).

The failure recovery part 130 generates a new entry in the virtual configuration management table 142 (step S2008), and then proceeds to step S2005.

More specifically, the failure recovery part 130 stores necessary information into the virtual server name 801, the server name 802, the OS 803, the processor 804, the memory 805, and the storage capacity 806 of the newly generated entry, and stores "resource reserved" into the status 807 of the newly generated entry. Further, the failure recovery part 130 generates change information to be used to change allocation of the job 240 to the new virtual server 220, and outputs the change information to the job management part 120. The change information includes an identifier of the server 200, an identifier of the virtual server 220, required machine specifications, and an identifier of the job 240.

In response to input of the change information, the job management part 120 transmits to the server 200 a request to generate the new virtual server 220 based on this change information. At this time, the job management part 120 changes the status 807 to "being generated."

In response to receipt of the instruction to generate the new virtual server 220, the server 200 generates the new virtual server 220 based on the required machine specifications in this instruction for generation, and notifies the job management server 100 of completion of the generation.

In response to receipt of this notification, the job management part 120 allocates the job 240 to the new virtual server 220. Further, the job management part 120 changes the status 807 to "reserved." Still further, the job management part 120 subtracts the reserved resource from an entry of the free resource management table 144 corresponding to the server 200 where the virtual server 220 is generated, thereby updating each column in the free resource management table 144.

The failure recovery part 130 may present results of the search processings in steps S1604 and S1607 to the administrator to allow the administrator to determine whether the reservation processing is to be performed.

According to one embodiment of this invention, in a case where a failure has occurred in the virtual server 220 executing the job 240, the performance of the virtual server 220 required to execute this job 240 is determined and the virtual server 220 is reserved.

This eliminates the need of preparing beforehand the standby server 200 or the standby virtual server 220 to which a job is to be moved. Additionally, the virtual server 220 is generated during execution of the job 240 and the virtual server 220 is erased after completion of the job 240. This allows effective use of a physical resource.

According to one embodiment of this invention, in a case where processing on a job net is not completed within the execution limit time 1105, allocation of the job 240 is changed (scheduled) while consideration is further given to the entire job net. This allows handling of a failure while exerting no influence on an entire task.

Modifications

A modification has a difference in that in the machine specifications determination processing, it changes allocation only of a required number of the jobs 240. The following description is intended mainly for this difference.

Figure 19A:
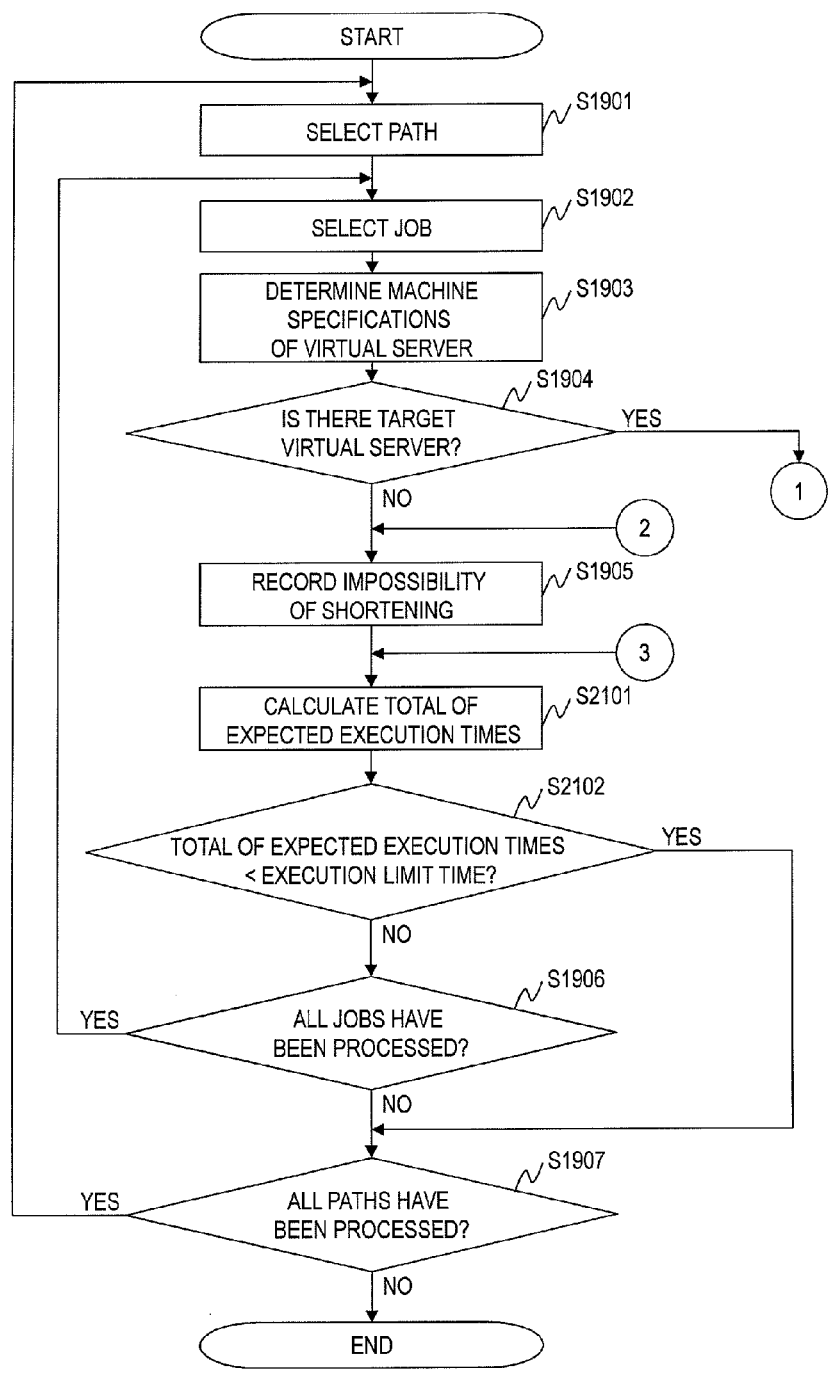
FIGS. 19A and 19B are flowcharts explaining in detail the machine specifications determination processing in the embodiment of this invention.
Figure 19B:
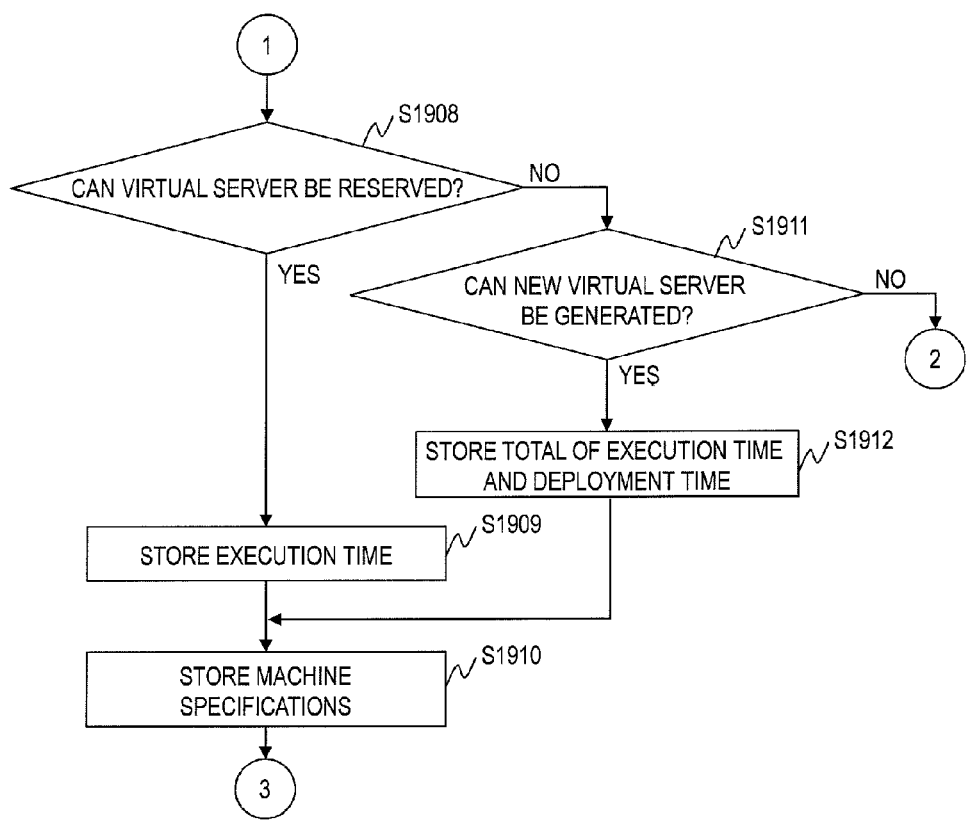

FIGS. 19A and 19B are flowcharts explaining in detail the machine specifications determination processing in the embodiment of this invention.

The processings in steps S1901 to S1912 are the same as those described above, thus descriptions thereof will be omitted.

In the modification, after steps S1905 and S1910, the failure recovery part 130 calculates a total of expected completion times after allocation change (step S2101).

More specifically, the failure recovery part 130 reads the value of the expected completion time 1406 about the job 240 selected in step S1902, and reads the value of the expected completion time 1405 about the job 240 not having been selected in step S1902. Further, the failure recovery part 130 sums up the read values of the expected completion times 1406 and 1405.

The failure recovery part 130 determines whether the calculated total of the expected completion times is smaller than the execution limit time 1105 (step S2102).

In a case where it is determined that calculated total of the expected completion times is smaller than the execution limit time 1105, the failure recovery part 130 completes the machine specifications determination processing on the selected path, and then proceeds to step S1907.

In a case where it is determining that calculated total of the expected completion times is the same as or greater than the execution limit time 1105, the failure recovery part 130 proceeds to step S1906.

The aforementioned processing changes allocation only of the job 240 required to be changed in terms of allocation. This can reduce a load on the entire system and suppress the quantity of a resource to be used.

What is claimed is:

1. A job management server for managing a plurality of jobs to be executed by at least one virtual computer generated on at least one computer, wherein the job management server comprises
    a first processor,
    a first memory connected to the first processor,
    a first interface connected to the first processor, the first interface establishing connection to an external device,
    a job management part to manage information on at least one job net which configures a plurality of jobs and allocate a plurality of jobs included in a job net to at least one virtual computer, and
    a recovery part to monitor an execution status of each of the plurality of jobs included in the job net and perform recovery processing in a case of detecting a failure in the virtual computer to execute a job,
    wherein the job management server is configured to:
    allocate a plurality of jobs included in a first job net to the at least one virtual computer, in a case of receiving an instruction to execute the first job net;
    specify at least one target job for changing allocation from the plurality of jobs included in the first job net, in a case where a failure has occurred in a first virtual computer to execute a first job included in the first job net;
    determine a performance of a virtual computer required to execute the at least one target job; and
    generate change information to be used to allocate the at least one target job to a new virtual computer having the determined performance; and
    wherein the job management server further stores job net management information storing the configuration of the at least one job net and information on a completion limit for the at least one job net,
    the at least one job net includes a plurality of paths indicating an execution path of the plurality of jobs,
    wherein the job management server is configured to:
    calculate expected completion time of each of a plurality of paths included in the first job net, the expected completion time being a total of execution times of all the jobs included in each of the plurality of paths;
    refer to the job net management information to specify a target path that is not to be completed within the completion limit for the first job net based on the expected completion time of the each of the plurality of paths thereby calculated; and
    specify, as the at least one target job, the first job and the at least one job to be executed after completion of the first job from a plurality of jobs included in the specified target path.

2. A job management server according to claim 1,
    wherein the job management server is configured to determine the performance of the virtual computer to which the at least one target job is to be allocated such that expected completion time of the target path is within the completion limit for the first job net.

3. A job management server according to claim 2,
    wherein the job management server further stores job execution time management information storing the job, the performance of the virtual computer, and execution time indicating completion time of the job in association with each other,
    wherein the job management server is configured to:
    refer to the job execution time management information to obtain first execution time in the virtual computer determined before allocation change of the at least one target job;
    refer to the job execution time management information to search for the performance of the virtual computer capable of executing the at least one target job within the execution time shorter than the first execution time; and
    determine the performance of the searched virtual computer as the performance of the new virtual computer.

4. A job management server according to claim 3,
    wherein the job management server further stores virtual configuration information on the configuration and the status of the virtual computer generated on the computer,
    wherein the job management server is configured to:
    refer to the virtual configuration information to determine whether there is the virtual computer to which a different one of the jobs is not allocated, the virtual computer satisfying the determined performance of the virtual computer;
    perform reservation processing in order to use this virtual computer as the new virtual computer, and generate the change information to be used to allocate the at least one target job to the reserved new virtual computer, in a case where it is determined that there is the virtual computer satisfying these conditions; and
    generate the change information, the change information including information to be used to generate the new virtual computer satisfying the determined performance of the virtual computer, the change information being to be used to allocate the at least one target job to the new virtual computer thus generated, in a case where it is determined that there is not the virtual computer satisfying these conditions.

5. A job management server according to claim 1,
    wherein the job management server is configured to:
    select a second job from the target path;
    refer to the job execution time management information to obtain second execution time in the virtual computer determined before allocation change of the second job;
    refer to the job execution time management information to determine, as the performance of the new virtual computer to which the second job is to be allocated, the performance of the virtual computer capable of executing the second job within the execution time shorter than the second execution time;
    calculate expected completion time of the target path in a case where allocation of the second job is changed to the new virtual computer;

determine whether the calculated expected completion time of the target path is within the completion limit for the first job net;

select a third job from the target path, in a case where it is determined that the calculated expected completion time is not within the completion limit for the first job net;

refer to the job execution time management information to obtain third execution time in the virtual computer determined before allocation change of the third job; and refer to the job execution time management information to determine, as the performance of the new virtual computer to which the third job is to be allocated, the performance of the virtual computer capable of executing the third job within the execution time shorter than the third execution time.

6. A job management method in a computer system, wherein the computer system includes a plurality of computers and a management server to manage a plurality of jobs to be executed by a plurality of virtual computers generated on at least one of the plurality of computers, herein each of the plurality of computers includes a first processor, a first memory connected to the first processor, and a first interface connected to the first processor, the first interface establishing connection to the job management server, wherein the management server includes a second processor, a second memory connected to the second processor, and a second interface connected to the second processor, the second interface establishing connection to the plurality of computers, wherein the second memory stores programs to realize a job management part and a recovery part, the job management part managing information on at least one job net which configures a plurality of the jobs and allocating the plurality of jobs included in a job net to at least one virtual computer, the recovery part monitoring an execution status of each of a plurality of jobs included in the job net and performing recovery processing, in a case of detecting a failure in the virtual computer to execute a job, wherein the programs are executed by the second processor, and wherein the job management method includes:

a first step of allocating, by the management server, a plurality of jobs in a first job net to at least one virtual computer, in a case of receiving an instruction to execute the first job net;

a second step of specifying, by the management server, at least one target job changing allocation from the plurality of the jobs included in the first job net, in a case where a failure is detected in a first virtual computer to execute a first job included in the first job net;

a third step of determining, by the management server, a performance of a virtual computer required to execute the at least one target job; and a fourth step of generating, by the management server, change information to be used to allocate the at least one target job to a new virtual computer having the determined performance; and wherein the job management server further stores job net management information storing the configuration of the at least one job net and information on a completion limit for the at least one job net, wherein the at least one job net includes a plurality of paths indicating an execution path of the plurality of jobs, and wherein the second step includes:

a fifth step of calculating expected completion time of each of a plurality of paths included in the first job net, the expected completion time being a total of execution times of all the jobs included in the each of the plurality of paths;

a sixth step of referring to the job net management information to specify a target path that is not to be completed within the completion limit for the first job net based on the expected completion time of the each of the plurality of paths thereby calculated; and a seventh step of specifying, as the at least one target job, the first job and at least one job to be executed after completion of the first job from a plurality of jobs included in the specified target path.

7. A job management method according to claim 6, wherein in the third step, the performance of the virtual computer to which the at least one target job is to be allocated is determined such that expected completion time of the target path is within the completion limit for the first job net.

8. A job management method according to claim 7, wherein the job management server further stores job execution time management information storing the job, the performance of the virtual computer, and execution time indicating completion time of the job in association with each other, and wherein the third step includes:

an eighth step of referring to the job execution time management information to obtain first execution time in the virtual computer determined before allocation change of the at least one target job; and a ninth step of referring to the job execution time management information to search for the performance of the virtual computer capable of executing the at least one target job within the execution time shorter than the first execution time.

9. A job management method according to claim 8, wherein the job management server further stores virtual configuration information on the configuration and the status of the virtual computer generated on the computer, and the third step includes:

a step of referring to the virtual configuration information to determine whether there is the virtual computer to which a different one of the jobs is not allocated, the virtual computer satisfying the determined performance of the virtual computer;

a step of performing reservation processing in order to use this virtual computer as the new virtual computer, and generating the change information to be used to allocate the at least one target job to the reserved new virtual computer, in a case where it is determined that there is the virtual computer satisfying these conditions; and a step of generating the change information, the change information including information to be used to generate the new virtual computer satisfying the determined performance of the virtual computer, the change information being to be used to allocate the at least one target job to the new virtual computer thus generated, in a case where it is demanded that there is not the virtual computer satisfying these conditions.

10. A job management method according to claim 6, wherein the third step includes:

a step of selecting a second job from the target path;

a step of referring to the job execution time management information to obtain second execution time in the virtual computer determined before allocation change of the second job;

a step of referring to the job execution time management information to determine the performance of the virtual computer capable of executing the second job within the execution time shorter than the second execution time;

a step of calculating expected completion time of the target path in a case where allocation of the second job is changed to the new virtual computer;

a step of determining whether the calculated expected completion time of the target path is within the completion limit for the first job net;

a step of selecting a third job from the target path, in a case where it is determined that the calculated expected completion time is not within the completion limit for the first job net;

a step of referring to the job execution time management information to obtain third execution time in the virtual computer determined before allocation change of the third job; and a step of referring to the job execution time management information to determine, as the performance of the new virtual computer to which the third job is to be allocated, the performance of the virtual computer capable of executing the third job within the execution time shorter than the third execution time.

* * * * *